United States Patent
Stewart et al.

(10) Patent No.: US 6,675,214 B2
(45) Date of Patent: Jan. 6, 2004

(54) METHOD AND APPARATUS FOR EFFICIENT STORAGE AND RETRIEVAL OF OBJECTS IN AND FROM AN OBJECT STORAGE DEVICE

(75) Inventors: Christopher H. Stewart, Tomball, TX (US); Svilen B. Pronev, Cypress, TX (US); Darrell J. Starnes, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/128,778

(22) Filed: Apr. 24, 2002

(65) Prior Publication Data

US 2002/0169818 A1 Nov. 14, 2002

Related U.S. Application Data

(63) Continuation of application No. 09/133,497, filed on Aug. 12, 1998, now Pat. No. 6,389,460.
(60) Provisional application No. 60/085,309, filed on May 13, 1998.

(51) Int. Cl.[7] .............................................. G06F 15/173
(52) U.S. Cl. ..................................................... 709/226
(58) Field of Search ................................ 709/226, 217, 709/203, 219, 247, 246; 707/10, 203, 103 R, 102; 711/118

(56) References Cited

U.S. PATENT DOCUMENTS

| | | | |
|---|---|---|---|
| 5,764,235 A | | 6/1998 | Hunt et al. |
| 5,918,013 A | * | 6/1999 | Mighdoll et al. ............ 709/217 |
| 5,946,699 A | * | 8/1999 | Sawashima et al. ........ 707/203 |
| 5,996,022 A | * | 11/1999 | Krueger et al. ............ 709/247 |
| 6,006,231 A | * | 12/1999 | Popa ........................ 707/101 |
| 6,073,168 A | * | 6/2000 | Mighdoll et al. ........... 709/217 |
| 6,128,623 A | * | 10/2000 | Mattis et al. ............ 707/103 R |
| 6,134,583 A | * | 10/2000 | Herriot ...................... 709/217 |
| 6,144,996 A | * | 11/2000 | Starnes et al. ............ 709/217 |
| 6,169,993 B1 | * | 1/2001 | Shutt et al. ............. 707/103 R |
| 6,256,712 B1 | * | 7/2001 | Challenger et al. ......... 711/141 |
| 6,343,350 B1 | * | 1/2002 | LaMaire et al. ............ 711/156 |
| 6,389,460 B1 | * | 5/2002 | Stewart et al. ............. 709/217 |
| 6,438,576 B1 | * | 8/2002 | Huang et al. .............. 709/202 |

OTHER PUBLICATIONS

R. Fielding et al., "Hypertext Transfer Protocol–HTTP/1.1," HTTP Working Group, Aug. 12, 1996, pp. 1–110.
"WinGate 2.1 is Officially Released," www.wingate.net, 1997.
"WinGate Opens the Internet Door," LAN Times (www.lanstimes.com/97/97jan/701b066a.html), Jan. 1997.
"Microsoft Proxy Server 1.0," Microsoft Corporation (www.microsoft.com/products/prodref/130__ov.htm).
"Microsoft Announces Proxy Server 2.0," Microsoft Corporation (www.microsoft.com/corpinfo/press/1997/oct97/proxy2pr.htm), Oct. 8, 1997.
"Microsoft Proxy Server 2.0; What's New," Microsoft Corporation (www.microsoft.com/proxy/guide/whatsnew:asp?a=2&B=1).
"Microsoft Proxy Server 2.0; Technical Papers, Cache Array Routing Protocol (CARP) Whitepaper," Microsoft Corporation (www.microsoft.com/proxy/guide/CarpWP.asp?A=2&B=3).

* cited by examiner

*Primary Examiner*—Ario Etienne
*Assistant Examiner*—Abdullah E. Salad

(57) ABSTRACT

Techniques for storing objects (e.g., images) in and retrieving objects from a storage device (e.g., image store) in a rapid and efficient manner are disclosed. More particularly, the techniques include: storage of an object in and retrieval of an object from the storage device with reference to an object locator together with state and permission information, use of a directory structure of a file system to efficiently provide database structure for storage of the objects, storage and retrieval of object states as attributes of associated files in the file system, storage and retrieval of multiple versions of objects, and multi-threaded management of the storage device.

20 Claims, 10 Drawing Sheets

METHOD AND APPARATUS FOR EFFICIENT STORAGE AND RETRIEVAL OF OBJECTS IN AND FROM AN OBJECT STORAGE DEVICE

CROSS-REFERENCE TO RELATED APPLICATIONS

The present application is a continuation of U.S. patent application Ser. No. 09/133,497 now U.S. Pat. No. 6,389,460, which claims the benefit of U.S. Provisional Application No. 60/085,309, entitled "METHOD AND APPARATUS FOR STORAGE AND DELIVERY OF CONTENT", and filed on May 13, 1998, each of the disclosures are incorporated herein by reference in their entireties for all purposes.

BACKGROUND OF THE INVENTION

1. Field of the Invention

The present invention relates to information storage and retrieval and more particularly, to storage and accelerated retrieval of objects from an object storage device.

2. Description of the Related Art

The Internet is a resource for tremendous amounts of content information. As examples, the content information can include text, images or other types of data. A user normally accesses the Internet using a connection provided by a modem and a regular telephone line or ISDN line, or by a T1 line or leased line. The connection to the Internet may be indirectly through an Internet Service Provider (ISP) or more directly to the Internet (or World Wide Web). The higher the bandwidth supported by the connection, the better the responsiveness of the Internet to the user's requests. For example, since a T7 line offers substantially greater bandwidth than does a 28.8 kbps modem and regular telephone line, the connection to the Internet provided by the T1 line will provide substantially faster responsiveness to a user's requests than would the 28.8 kbps modem.

A uniform resource locator (URL) is a unique identifier for a particular content location in the Internet. Every object located on the Internet has an associated URL. Each URL is divided up into four pieces, protocol, host name and port, uniform resource identifier (URI), and query. Furthermore, the content actually served from a particular URL location can depend on associated factors, such as cookies and authorizations which are sent between the requesting client and the content server using the Hypertext Transfer Protocol (HTTP). HTTP is one of several Internet protocols for transporting data between client and servers. Other transport protocols include file transport protocols, gopher, file and WYSIWIG. An Internet host (e.g., content server) is an entity on the Internet which has either a domain name, an IP address or both, and which is capable of serving content to requesting clients. A URI is a particular location of data on the Internet host. A query is a text string passed from the client to the host which requests a particular piece of data from a particular URI location within the host. A valid URL request sent by a client must contain a protocol, a host and a URI. The query is optional.

Internet proxy servers have been used to allow multiple users to share Internet access through a common high speed connection. Examples of such Internet proxy servers are (1) WinGate available from Deerfield Communications Company and (2) Microsoft Proxy Server available from Microsoft Corporation. Shared connections facilitate providing firewalls to prevent unauthorized access into the user's (e.g., corporate) internal computers. These shared connections can also provide the Hypertext Transfer Protocol (HTTP) caching to allow improved responsiveness. These Internet proxy servers can also provide site filtering to prevent user (behind the Internet proxy server) access to certain Internet sites.

HTTP caching operates to locally store frequently accessed Internet material so that it is quickly available when subsequently requested. HTTP caching is described in detail in the Hypertext Transfer Protocol (HTTP) document, version 1.1, which is hereby incorporated by reference. Such caching enables an organization to more efficiently share the bandwidth of the Internet connection.

Conventionally, the delivery over the Internet of similar data in different formats was achieved in several different ways. One way is to present the user with a low resolution version of an image but then allow the user to click on the image to request a higher resolution version. A second way is to allow for initially load-up a low resolution version of an image to the user while a higher resolution version loads in the background. A third approach is by content negotiation between content server and user so that a client can request a high or low resolution version from the content server at the same URL. The content negotiation can be achieved by communicating cookies and authorizations between the user and the content server or by a POST request to a dynamic URL located on the content server. A POST request is an HTTP mechanism that allows a browser to send data to a content server.

Content negotiation is known and described in the HTTP document, version 1.1. Content negotiation is the process in which a HTTP response to a HTTP request is chosen to be that which is most suitable, assuming of course that there is a choice. The content negotiation can be client-driven or server-driven. The content differences being negotiated can vary widely but are nevertheless stored on a content server on the Internet. As an example, the content differences could be different languages or different size images. In such a case, a client may negotiate on behalf of a user with a content server to receive smaller (e.g., less robust, lower quality, or smaller image area) images instead of commonly provided larger images from the server. If the content server can provide the smaller images, then the user is able to receive and display the information (e.g., images) faster than had their been no choice or no negotiation. Thus, in some cases, the negotiation facilitates improved bandwidth utilization and responsiveness of the Internet. One problem with the conventional approaches to negotiated content delivery over the Internet is that most content servers do not offer multiple versions of information content. As a result, content negotiation, even if available, is not supported by most content servers. There are also no standards on what types of versions or variations of information content a content server should make available. Consequently, content negotiation is difficult to obtain over the Internet.

One problem of all of these conventional approaches is that the content server is required to support and maintain both a high resolution and a low resolution version of an image or object. While both versions occupy the same logical location on the Internet (e.g., URL) the content server must allocate separate physical space for each version. Also, content providers must expend and utilize scarce resources to provide multiple versions of the same content.

Other problems are concerned with efficiently storing, using and managing the cache. Conventionally, a proxy server generally reserves or provides a single location in a cache for a single URL. In other words, images stored in the cache are identified only by URLs. However, such an approach ignores the fact that URLs are often modified by cookies or authorizations. See HTTP, version 1.1. This is a deficiency of the conventional approaches because cookies and authorizations impact the availability of images. Further, the storage of images within a cache for a proxy server has been conventionally done using a standard database (with either a relational database model or a hierarchical database model). The relational database model typically does not offer high-performance and developing a database system tends to require a lot of time and associated cost. In a hierarchical database model data is stored as nodes in a tree structure, and the edges of the tree are identified by particular keys which identify the location of the data within the database. The tree nodes store the data, and the tree edges which point to successive nodes facilitate retrieval of the data. While the hierarchical model is a faster model than the relational model, there is still sufficient overhead associated with the database engine being utilized. These problems associated with the conventional approaches are typically associated with the cost of the system and its performance.

Thus, there is a need for improved techniques for caching information content from a remote content server in a temporary storage device as well as for delivering information content from the temporary storage device to a user.

SUMMARY OF THE INVENTION

The invention pertains to techniques for storing objects (e.g., images) in and retrieving objects from a storage device (e.g., image store) in a rapid and efficient manner. The various aspects of the invention include: storage of an object in and retrieval of an object from the storage device with reference to an object locator together with state and permission information, use of a directory structure of a file system to efficiently provide database structure for storage of the objects, storage and retrieval of object states as attributes of associated files in the file system, storage and retrieval of multiple versions of objects, and multithreaded management of the storage device.

The invention can be utilized in a variety of systems or apparatuses, but is particularly well suited for use in a proxy system for a network (e.g., the Internet) wherein the database storage stores an object identifier, state information and permission information. A proxy system operates to store (e.g., caching) object files in a storage device (e.g., image store) so that these object files are able to more quickly and efficiently be supplied to requestors coupled to the proxy system. A directory structure points to resulting directories in the storage device where one or more different versions of an object can be stored. When the storage device is used as a cache device that provides temporary storage, the management of the storage device operates to clean out the storage device to remove expired data as well as to prevent overflow.

The proxy system can also include an acceleration apparatus (e.g., an acceleration server). Such a proxy system is able to produce an accelerated version of content information from the network, cache the accelerated version (and possibly original versions) for subsequent requests for the same information content, and supply the accelerated version of the information content to a requesting user.

The invention can be implemented in numerous ways, including as a method, an apparatus, a system, or computer readable medium. Several embodiments of the invention are summarized below.

As a method for storing objects in an object storage device, one embodiment of the invention includes the operations of: receiving a uniform resource locator, state information and authorization information associated with a particular object to be stored in the object storage device; combining the uniform resource locator, the state information and the authorization information to obtain an object identification string; dividing the object identification string into a plurality of individual directories, the individual directories form a directory path to a resulting directory where the particular object is to be stored; and storing at least one version of the particular object in the resulting directory in the object storage device. Optionally, the invention can also include the operations of producing a second version on the particular object by reducing the size of the first version of the particular object; and subsequently storing the second version of the particular object in the resulting directory in the object storage device. As another option, the object storage device is a database, and at least a part of the database has a directory structure of a file system used with the object storage device.

As a method for storing an image in an image storage device, one embodiment of the invention includes the operations of: receiving URL and associated HTTP Request and HTTP Response information; parsing the HTTP Request information and the HTTP Response information to obtain cookies and authorizations contained therein; merging the cookies if related cookies are contained in the HTTP Request and the HTTP Response; forming an image identification string by combining the URL, the merged cookies and the authorizations; hashing the image identification string to produce a hash directory; replacing unpermitted characters in the image identification string with predetermined replacements; dividing the image identification string to form a directory path having a series of individual directories; forming the individual directories of the directory path in the image storage device to the extent not already present; and storing at least one file in a resulting directory identified by the directory path.

As a proxy system for accelerated delivery of objects to a requester, one embodiment of the invention includes: an object storage device for storing objects, and a proxy server coupled between the requester's computer and a network of computers. The object storage device uses a file system that supports directories to store the objects in files at directory locations within said object storage device. The directory location where each object is to be stored is identified by an object locator associated with the network together with state and authorization information. The proxy server intercepts a request for an object from the requester's computer to the network of computers, and then satisfies the request by delivering the object requested from said object storage device to the requestor's computer. The object requested from said object storage device is retrieved from said object storage device using a combination of an object locator obtained from the request together with state and authorization information associated with the request. Optionally, the proxy system can also include an acceleration unit to produce an accelerated version of certain of the objects stored in said object storage device. As another option, the directory structure within said object storage device can be used to implement a database. As still another option, the combination of the object locator together with state and authorization information identify a unique slot in said object storage device, and each of the slots can store files pertaining to a different version of an associated object.

As a proxy system for accelerated delivery of objects to a requestor, another embodiment of the invention includes:

an object storage device for storing objects, and a proxy server coupled between the requester's computer and a network of computers. The object storage device uses a file system that supports directories to store the objects in files at directory locations within said object storage device. The directory location where each object is to be stored is identified by at least an object locator. The proxy server intercepts a request for an object from the requester's computer to the network of computers, and then satisfies the request by delivering the object requested from said object storage device to the requestor's computer. The object requested from said object storage device is retrieved from said object storage device using an object locator obtained from the request. Optionally, the object storage device also stores a current state for each of the files. As another option, the directory structure within said object storage device implements a database. As still another option, the proxy system can include an acceleration unit that produces an accelerated version of certain of the objects stored in said object storage device.

As a proxy system for temporarily storing objects previously requested by a requestor, another embodiment of the invention includes: an object storage device for storing objects, a proxy server coupled between the requester's computer and a network of computers, and an object storage device cleaner. The proxy server intercepts a request for an object from the requester's computer to the network of computers, and then satisfies the request by delivering the object requested from the object storage device to the requestor's computer. The object requested from the object storage device is retrieved from the object storage device using an object locator obtained from the request. The object storage device cleaner operates to clean out from the object storage device those objects that are aged using a plurality of concurrent processes or threads that operate on different criterion in cleaning out the object storage device.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
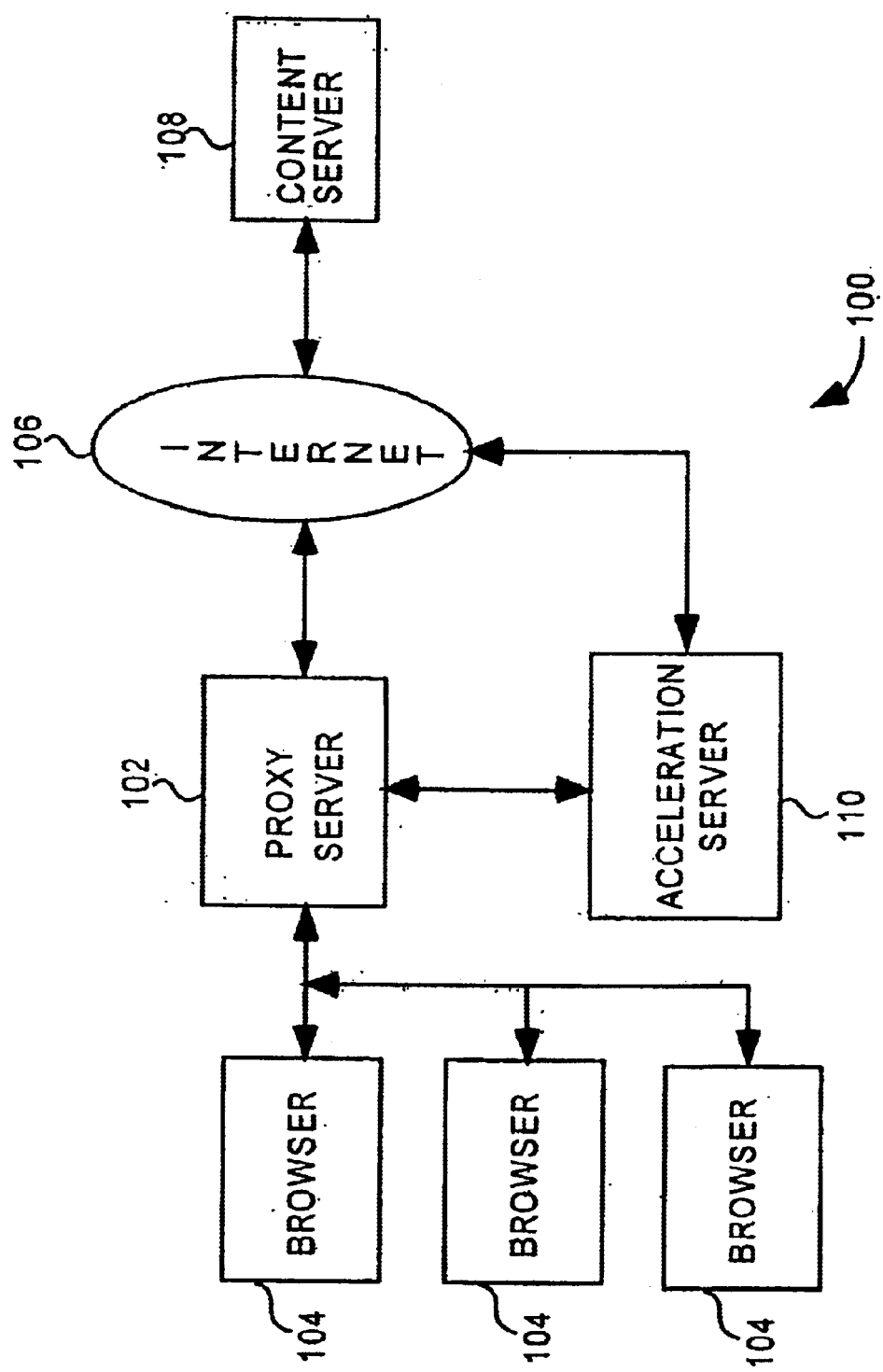
FIG. 1 is a proxy system that provides improved data delivery over a network according to an embodiment of the invention.

The invention pertains to techniques for storing objects (e.g., images) in and retrieving objects from a storage device (e.g., image store) in a rapid and efficient manner. The various aspects of the invention include: storage of an object in and retrieval of an object from the storage device with reference to an object locator together with state and permission information, use of a directory structure of a file system to efficiently provide database structure for storage of the objects, storage and retrieval of object states as attributes of associated files in the file system, storage and retrieval of multiple versions of objects, and multi-threaded management of the storage device.

The improved techniques according to the invention can be utilized in a variety of systems or apparatuses, including a proxy system having an acceleration apparatus (e.g., an acceleration server). Such a proxy system is able to produce an accelerated version of content information from the network, cache the accelerated version (and possibly original versions) for subsequent requests for the same information content, and supply the accelerated version of the information content to a requesting user. Some techniques according to the invention are well suited for use with a multi-threaded operating system so that high performance operation can be obtained.

The invention is particularly well suited for use in a proxy system for a network (e.g., the Internet) wherein the database storage stores an object identifier, state information and permission information. The directory structure points to resulting directories in the storage device where one or more different versions of an object can be stored. The objects are stored as files by a file system, and object states for the stored objects can be stored as attributes for the files. When the storage device is used as a cache device that provides temporary storage, the management of the storage device operates to clean out the storage device to remove expired data as well as to prevent overflow. Although the storage device can generally store objects, for ease of understanding, much of the discussion below assumes that the objects being stored are image files. However, it should be recognized that the objects could also pertain to a variety of other things such as video, audio, etc.

A proxy system operates to store (e.g., caching) image files in a storage device (e.g., image store) so that these image files are able to more quickly and efficiently be supplied to requesters coupled to the proxy system. The proxy system also allows requesters to view data in several different versions, namely, an original version and various possible accelerated or compressed versions. Hence, only a single version of the data needs to be provided on a content server, and the content server need not worry about providing different versions. The construction, arrangement and usage of the storage device (e.g., image store) facilitates the rapid storage of images to and retrieval of images from the storage device.

Embodiments of the invention are discussed below with reference to FIGS. 1–8. However, those skilled in the art will readily appreciate that the detailed description given herein with respect to these figures is for explanatory purposes as the invention extends beyond these limited embodiments.

FIG. 1 is a proxy system 100 that provides improved data delivery over a network. The proxy system 100 includes the proxy server 102 that couples to network browsers 104. The proxy server 102 is also coupled to the Internet 106. The Internet 106 is a collection of interconnected computer systems, some of which act as content servers. Accordingly, FIG. 1 illustrates the Internet 106 coupled to a content server 108 as a representative one of the content servers associated with the Internet 106. Additionally, the proxy system 100 includes an acceleration server 110. The acceleration server 110 couples to the proxy server 102 as well as the Internet 106.

The proxy system 100 is able to provide improved content (data) delivery over the Internet 106. Namely, the proxy system 100 operates to speed up the response time that a user of one of the browsers 104 undergoes after requesting some content from the content server 108 until the requested content is supplied to the user at the one of the browsers 104.

The general operation of the proxy system 100 is as follows. Normally, as a user of one of the browsers 104 makes a request for data from a content server on the Internet 106. The proxy server 102 initially intercepts the request for data from the browser 104 and determines whether the request for data can be satisfied locally by the proxy server 102 or the acceleration server 110. When the proxy server 102 determines that the request for data cannot be satisfied locally, the proxy server 102 forwards the request for data to the content server 108 through the Internet 106. In this case, the previously intercepted request for data is passed through the proxy server 102 to the content server 108 via the Internet 106 so that the request for data can be satisfied in a conventional, unaccelerated manner.

On the other hand, when the proxy server 102 determines that the request for data can be satisfied locally with an improved response time (i.e., accelerated delivery) to the user, then the proxy server 102 and the acceleration server 110 operate to satisfy the request for data using information locally stored, thereby avoiding the need to traverse the sluggish Internet 106 and retrieve the requested data from the content server 108. Also, if the acceleration server 110 believes it can satisfy the request for data locally but the necessary information is not yet locally available, then the acceleration server 110 operates to retrieve the requested data from the content server 108 with a pre-fetch operation and then locally store the necessary information. Thereafter, the acceleration server 110 can satisfy the request for data from local storage. In either of these cases, the data returned to the browser 104 in response to the request for data will not only be locally available but also be reduced in size (e.g. reduced file size). Both of these features contribute to the ability of the proxy system 100 to significantly improve the response time in which the requested data can be delivered to the browser 104. Accordingly, the proxy server 102 acting together with the acceleration server 110 is able to accelerate the delivery of the requested data to the user of the browser 104 that has made the request.

During normal operation of the proxy system 100, the addition of the acceleration server 110 to the proxy system 100 causes the delivery of requested data to be delivered to a user in an accelerated manner. However, if the number of users (i.e., clients) being serviced by the proxy system 100 becomes significant and the number of accelerated versions needed at any point in time becomes too large for the acceleration server 110 to handle, this concentrated processing burden can cause the performance of the acceleration server 110, and thus the proxy system, to degrade. The invention resolves this potential problem by managing the load on the acceleration server 110 such that even in the worst case condition the performance of the proxy server 100 is, for example, no worse than it would be had the proxy system been a conventional proxy server (i.e., without acceleration capabilities).

Figure 2:
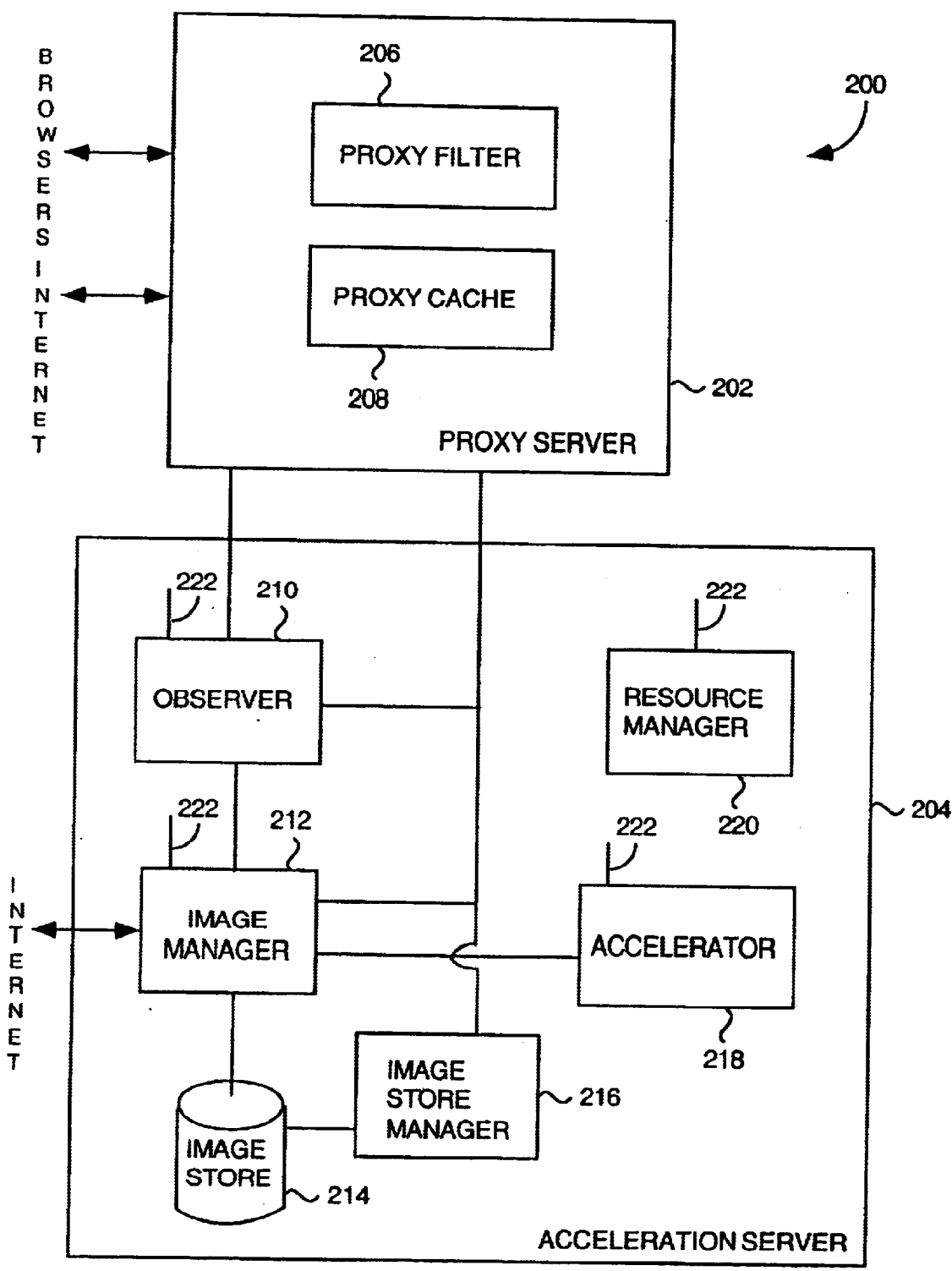
FIG. 2 is a block diagram of a proxy system according to an embodiment of the invention.

FIG. 2 is a block diagram of a proxy system 200 according to an embodiment of the invention. The proxy system 200 includes a proxy server 202 and an acceleration server 204. As an example, the proxy server 202 can correspond to the proxy server 102 illustrated in FIG. 1, and the acceleration server 204 can correspond to the acceleration server 110 in FIG. 1.

The proxy server 202 includes a proxy filter 206 and a proxy cache 208. The proxy filter 206 monitors requests for data received from the browsers 104. The proxy filter 206 then filters out those requests that it believes it can accelerate the delivery of the requested data to the user of the browsers 104. The proxy filter 206 then forwards these requests that it believes it can accelerate to the acceleration server 204. The proxy cache 208 operates as a cache storage area in which responses to earlier requests from the Internet 106 made by the browsers 104 can be temporarily saved and satisfied thereafter from the proxy cache 208 if any of the browsers 104 make the same request for data while the data remains stored in the proxy cache 208. Hence, the proxy cache 208 provides local storage for content data that was previously requested by one of the browsers 104, and thus provides rapid access to the same content data as long as the content data remains stored in the proxy cache 208. However, the content stored in the proxy cache 208 is not accelerated, but merely nonaccelerated content obtained by the proxy server 202 from a content server through the Internet 106.

It should be noted that conventional proxy servers include a cache to temporarily store content obtained from a content server via the Internet. An example of such a conventional proxy server is Microsoft Proxy Server, produced by Microsoft Corporation. Hence, the proxy server 202 includes the proxy cache 208 because the proxy system 200 according to the invention can be built using a conventional proxy server suitably modified to include primarily the proxy filter 206. In other words, the proxy cache 208 need not be included in the proxy server 202 of the proxy system 200 or if provided can be disabled or used in conjunction with the acceleration server 204.

The proxy filter 206 supplies those of the data requests it believes it can accelerate to the acceleration server 204. For example, a data request (e.g., World Wide Web page request) can be evaluated to determine if it includes images. Given that images are separate files that tend to have relatively large file sizes, images are good candidates for acceleration. Hence, a data request associated with one or more images files (such as many World Wide Web pages) is an example of a data request that the proxy filter 206 would believe it could accelerate. Also, another common data request would be an image request (e.g., GET image request in HTTP) for a particular image file from a content server via the Internet. The proxy filter 206 would also believe it could accelerate the delivery of such image files.

The acceleration server 204 includes various components to perform processing operations used in producing and/or supplying an accelerated response to a data request back to the proxy server 202. The major components of the acceleration server 204 are illustrated in FIG. 2 and discussed below.

An observer 210 receives a data request via the proxy filter 206. The observer 210 examines the data request to identify images associated therewith. In this embodiment, the acceleration server 204 is operating to accelerate the delivery of images to the browser 104 that made the request for data that is or includes the images. The identified images are then forwarded to an image manager 212. The image manager 212 determines whether the desired images are already stored in an image store 214. The image manager 212 can determine those images already stored in the image store 214 using an image store manager 216. If the desired images are already stored in the image store 214 when requested by the requesting browser 104, copies of the desired images are supplied from the image store 214 to the proxy server 202 and then forwarded from the proxy server 202 to the requesting browser 104. On the other hand, if the image manager 212 determines that the requested images are not yet stored in the image store 214, then the images can be obtained directly from the Internet by the image manager 212 using a high speed connection. Once retrieved, the images are evaluated to determine whether they can be accelerated by an accelerator 218. If the images can be accelerated, then the accelerator 218 produces an accelerated version of the image and stores the accelerated version in the image store 214. Additionally, the image manager 212 can also store an original version of the image in the image store 214. Thereafter, the proxy server 202 can return the requested image to the requesting browser 104 in a rapid manner when requested by the requesting browser 104. When the proxy server 202 has an accelerated version of the image to return to the browser 104, the response time to the browser 104 is even further improved by the proxy system 200. Namely, the time to transmit a file (e.g., image file) from the proxy system 200 to one of the browsers 104 is proportional to file size. Therefore, given that the accelerated versions have a smaller size, the accelerated versions can be transmitted to the browsers 104 in a reduced amount of time (i.e., improved response time). Also, in cases of excessive processing load, the acceleration server 204 can take appropriate action to reduce the processing load due to production of accelerated versions so that the overall responsiveness of the proxy system 200 is not hindered even in worst case conditions.

The image store 214 provides storage for images and provides image data to requesting other components of the proxy system 200. Additionally, as noted above, the image store 214 is also associated with an image store manager 216 that manages the allocation of slots, the removing of old slots, and provides state management of slots and objects.

The images stored in the image store 214 include original versions of images that have been retrieved from a content server (e.g., original versions) and accelerated versions of these images. More particularly, within each slot provided in the image store 214, a collection of information is provided, including HTTP request and response entities, validity information (used to implement HTTP cache coherency algorithms), statistics information, and a collection of related objects (e.g., images). Typically, the collection of related objects includes an original object and one or more accelerated objects. Associated with each object is not only the object data itself but also object state information (e.g., loading, done, etc.).

Generally, the image store 214 can operate to provide the following functions: creation of the slot, adding an object to the slot, streaming data to fill an object within a slot, retrieval of an object from a slot, and checking if a slot is within the image store 214. Additionally, in the background mode, the image store 214 in conjunction with the image store manager 216 can also function to perform validity checking, storage management, and slot and object state management. Normally, to prevent the image store 214 from filling up and remaining full, the slots within the image store 214 should be recycled periodically to manage the space for storage provided by the image store 214.

The image store 214 can also maintain and implement a HTTP proxy cache coherency protocol for all images stored in the image store 214. The image store 214 can be created in a number of different ways. For example, the image store can be implemented as a proxy cache, a database or a HTTP server with extensions, or some combination of the foregoing. Further, the image store 214 can also be accessed by a common standard interface that is usable by the other components of the proxy system 200. In one embodiment, the interface is achieved by an image store plug-in (e.g., a DLL or a shared library), and the image store 214 uses a database and a MS PROXY 2.0 to implement the image store 214.

The image store 214 operates as a database for images. A database is a mechanism that facilitates storage, retrieval and viewing of data.

One aspect of the invention is that a database for an image store (e.g., image store 214) can be provided using a file system. In such a design, there is no need for a separate database engine as is often conventionally required because the existing file system for the operating system can be used as the database for relatively simple data models. According to this aspect of the invention, the database for the image store is implemented as a series of directory structures and files on the operating system whose file system supports files and directories. In such a hierarchical model, directories become the tree edges necessary for quickly identifying where the data requested is needed, and the files themselves become the nodes where the data is stored.

The operation of the database according the invention is as follows. Data is retrieved when an application or a user requests it using keys which identify the data. For example, the keys can include URL, cookie, authorization and image type. Data is written to the location identified by its associated keys. A data request is handled by turning it into a sequence of directories which point to an appropriate file that contains the requested data. As for writing of data, files are created to store the data at the location pointed to by a sequence of directories. The directories and files can be considered to represent a more abstract data organization mechanism.

Conventionally, in storing images in a cache of a proxy system, proxy systems have encoded the URL as a file and have stored the URL, cookie and authorization as distinct information in a database. However, such systems encode only the URL and thus prohibited the caching of unique objects where the URL is the same but the cookies and/or authorizations differ. Further, the file system was conventionally required to perform a comparison of the cached filenames with the requested file name which is a processing intensive operation given that the encoded URLs can reach several hundred or thousand characters a minute. Normally, a database design which uses the URL, cookie and authorizations as keys to identify unique locations in a database would also suffers from similar comparison overhead.

According to another aspect of the invention, most of the comparison overhead can be avoided because the location of the desired data is stored as a series of nested directories. Hence, the overhead needed with a conventional database are removed since a database engine is no longer required. With this aspect, the nested directories are formed using a combination of the URL, cookies and authorization. As a result, the URL, cookies and authorizations are all encoded and cached (i.e., stored in the image store). The requester is thus able to go directly to a directory location and once there either retrieves the data or fails to retrieve the data. File names stored at the directory location are relatively short so that any comparison complications are relatively small.

A cookie is a state-control mechanism used by the hypertext transport protocol (HTTP) to enable an HTTP content server to deliver different content to different client users. An authorization (e.g., HTTP authorization) is a mechanism to identify a client user and authenticate that user via a password. A uniform resource locator (URL) is a unique identifier for a logical location on a network (e.g., the Internet) from which different data can be retrieved.

In one embodiment this aspect of the invention is implemented as an object or subsystem within a proxy system. The object or subsystem according to this aspect of the invention accepts HTTP requests and response data, parses out cookies, authorizations and the URL, and associates them with a particular directory structure on the file system. At that directory location, the proxy system (or associated subsystem) stores the image data received from the content server. One or more accelerated versions of the image data can also be stored at the directory location. The data retrieval works in a similar fashion to identify the appropriate directory location from which the data desired can be retrieved. As a result, subsequent lookups are fast because when the directory structure is present the proxy server arrives at the directory location very rapidly, and subsequent searching of the file names within the directory location is minimal. Hence, according to this aspect of the invention, a proxy system identifies not only a URL but also the associated cookies and authorizations, and then generates a unique entry in a cache so that the user-specific data may also be stored in the proxy server. The creation or formation of the unique entry is described with respect to blocks 502–508 of FIG. 5.

Conventionally, state information has be stored as part of an object or in shared memory. The shared memory approach allows multiple processes to share the information. Still another approach is to store the object's state in a database or in a file.

According to another aspect of the invention, object states are stored in the image store as attributes associated with a particular file. A state attached to an object stored in the image store is an indicator of the stage of execution at which the object currently finds itself. Thus, a state can indicate what has happened to a particular object at a particular point in time. The file system is a method for organizing data on an external storage device. Hence, file attributes provided by a file system are used as indicators of the properties associated with files within the image store that store objects.

Given that the file system is used in storing the images for the image store, the ability to also store state information as attributes with files is very useful and efficient. This approach is particularly beneficial over the conventional approaches. The ability for multiple processes to use the information is provided without the significant amount of overhead, memory resources and development costs. The shared memory approach would require higher development costs and a large amount of memory resources. Another approach would be to store state information in the database or a file, but this also requires significant management efforts as does shared memory. Also, in such cases, the database record or file would need to be opened every time a state needs to be changed or checked. In contrast, according to the invention, storing state as an attribute associated with the particular file is much less expensive than storing state information in a database or file. Other advantages of using the attributes of files to store the states are that after a file is written; hence, as the state of the object changes, only the attributes of the file need to be changed, not the data held in the file. Thus, several write operations are eliminated by this approach. Further, a requesting application need not open a desired file until the associated file system attributes for the object being requested show that the object has entered a ready state.

One way to implement this aspect of the invention is with an object which abstracts the representation of the state of another object stored on the file system as an attribute associated with the file. The most suitable environment for such an implementation is one in which several different processes and/or threads, each independent of the others, must gain access to the state of several objects shared between the processes. The state request mechanism is abstracted so that none of the processes which need to access the state have to know which file system attributes correspond to which state nor even the fact that state is held in the attributes. The abstracting object is also used to manage the state sets and state checks.

When several independent threads or processes all need to check object states or write object states, and the system is implemented on an operating system whose file system implements file and directory attributes, these attributes become indicators of the states. Whenever a process or thread needs to update a state, it can call a requisite state-setting function which in turn uses the operating system to set file state. The state-setting function manages which attributes mean what states, and the operating system manages the state update, including any necessary synchronization between separate threads and processes. Whenever a particular thread or process must request the particular state of an object, it can call an appropriate state-request function, which in turn uses the operating system to request the current attributes associated with the file or directory, and then translate those attributes into the appropriate state of the object whose state is stored in a particular file or directory. Thus, a requesting application need not open and read the file which contains the data pertaining to the desired object until it knows that the object has entered a desired state. Accordingly, several repetitive and often unnecessary file-open and file-read operations are thus eliminated.

In one embodiment, the components of the acceleration server 204 monitor their own level of service and availability. These components can also monitor the level of service and availability of the system with which they communicate. The components include a recovery mechanism to provide a minimal level of service. The recovery mechanism uses a combination or timers, resource level tracking and retry logic to provide a minimal level of service. If necessary, the processing can be disabled for a particular request. In general, each component is responsible for the level of service that it provides. Hence, as a hierarchy, each level of the system, provides and maintains a minimum level of service, thus allowing the proxy system to provide a minimum service level.

Although the acceleration server 204 illustrated in FIG. 2 illustrates only a single image manager 212 and a single accelerator 218, it should be recognized that the architecture of the proxy system 200 is such that a plurality of image mangers and accelerators can be provided. In other words, the acceleration server 204 and/or its components are scaleable. By being able to extend the processing capabilities of the acceleration server 204 in this manner, the proxy system 200 can scale to handle a wide range of loads by distributing the processing across the available processing resources. A resource manager 220 supplies configuration information 222 to the observer 210, the image manager 212, and the accelerator 218. In a case in which there are multiple image managers or accelerators, the resource manager 220 forwards the necessary configuration and initialization information to the image managers and accelerators.

Additional details on the operation of the proxy system 200 are described in detail below with respect to FIGS. 3–8.

Figure 3:
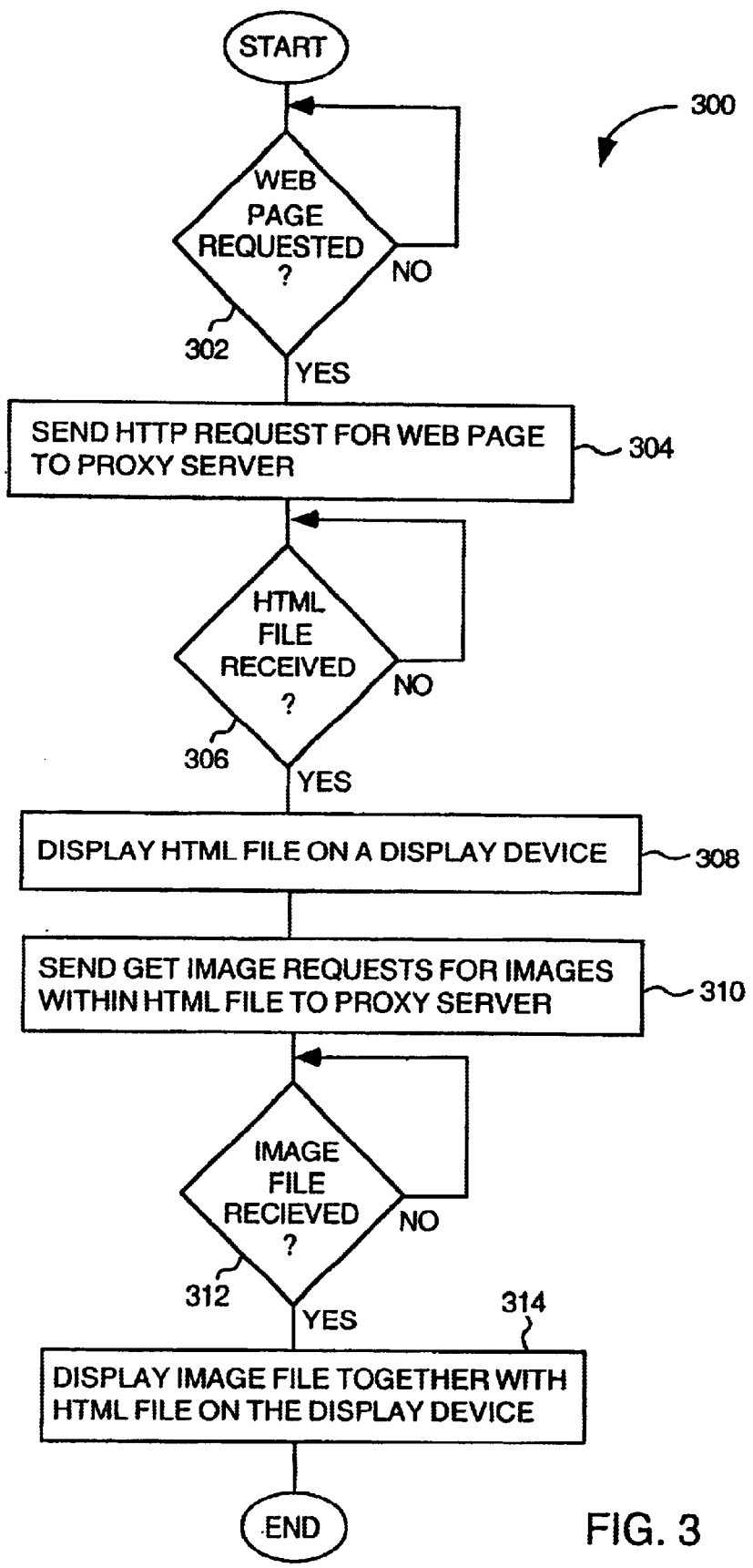
FIG. 3 is a flow diagram of browser processing which interacts with a proxy system according to an embodiment of the invention.

FIG. 3 is a flow diagram of browser processing 300 which interacts with a proxy system according to an embodiment of the invention. The browser processing 300 is typically performed by a browser, namely an Internet browser, such as the browsers 104 illustrated in FIG. 1.

The browser processing 300 initially begins with a decision block 302 that determines whether a web page request (e.g., WWW page request) has been received. The decision block 302 causes the browser processing 300 to wait until it receives such a page request. Hence, once a web page request has been received, the browser processing 300 continues.

After a web page request has been received, a HTTP request for the web page is sent 304 to a proxy server. Then, a decision block 306 determines whether an HTML file has been received. Here, the decision block 306 is waiting the return of the HTML file that is associated with the HTTP request. Once the HTML file is received, the browser processing 300 continues.

When the browser processing 300 continues, the HTML file that has been received is displayed 308 on a display device. The display device is a monitor on which information for a user of the browser is displayed. Next, the browser operates to send 310 get image requests for images within the HTML file to the proxy server. In other words, a HTML file associated with the web page typically includes embedded requests for images that make up portions of the web page. Hence, in block 310, the browser operates to send get image requests for each of the images within the HTML file to the proxy server.

Next, a decision block 312 determines whether an image file has been received in response to the get image request. If an image file has not yet been received, the decision block 312 causes the browser processing 300 to await its reception. Once the image file has been received, the image file together with the HTML file are displayed 314 on the display device. Following block 314, the browser processing 300 is complete and ends. However, it should be recognized that as soon as the browser makes another request for a web page, the browser processing 300 will again resume from the beginning. Also, it should be understood that when multiple get image requests are sent in block 310, blocks 312 and 314 are repeated for each of the images as they are received.

The processing performed by a proxy system according to an embodiment of the invention is described in FIG. 4 as follows. The processing here is concerned with storage of requested images in an image store. The stored images being either or both of an original and accelerated versions. In one embodiment, the image store is the image store 214 illustrated in FIG. 2. In general, the image store is a data storage device that provides magnetic, optical, etc. type data storage. Hereafter, for ease of understanding, the data storage device is considered to be a hard disk drive or a series of hard disk drives.

Figure 4:
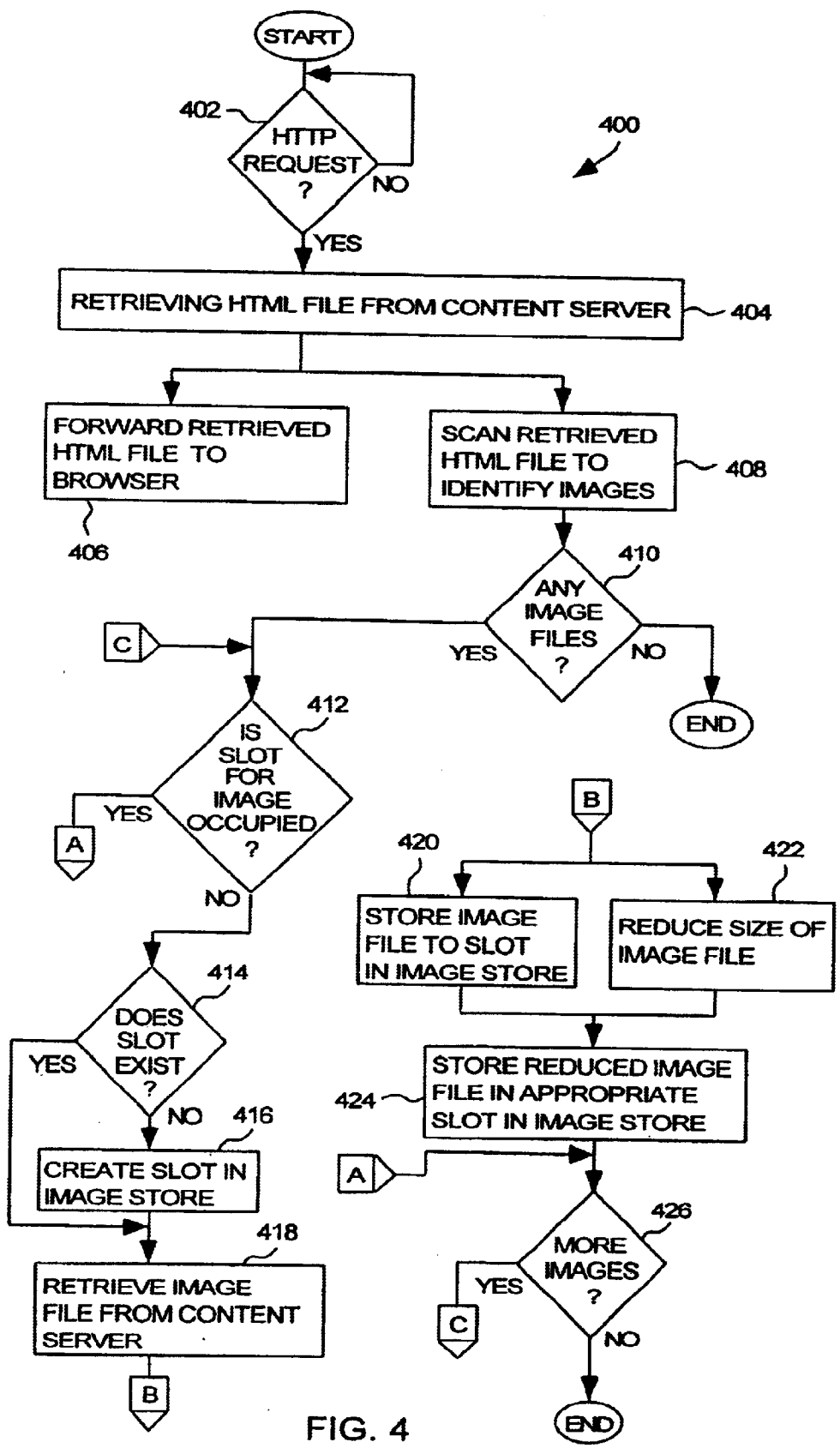
FIG. 4 is a flow diagram of HTTP request processing according to an embodiment of the invention.

FIG. 4 is a flow diagram of HTTP request processing 400 according to an embodiment of the invention. The HTTP request processing 400 is, for example, performed by the proxy server 102 and the acceleration server 110 illustrated in FIG. 1 or the proxy server 202 and the acceleration server 204 illustrated in FIG. 2.

The HTTP request processing 400 initially begins with a decision block 402 that determines whether a HTTP request has been received. The decision block 402 causes the HTTP request processing 400 to wait until it receives a HTTP request from a browser. Stated differently, the HTTP request processing 400 begins when a HTTP request has been received at a proxy server from a browser.

Once an HTTP request has been received, an HTML file associated with the HTTP request is retrieved 404 from a content server via the Internet 106. Next, the retrieved HTML file is forwarded 406 to the browser that issued the HTTP request. In one embodiment, the proxy server 102, 202 can perform the forwarding operation. Simultaneous with the forwarding 406, the retrieved HTML file is also scanned 408 to identify images embedded in the HTML file. The embedding of image files within an HTML file is, for example, commonplace in providing graphical images as part of a web page. In one embodiment, the observer 210 of the acceleration server 204 can perform the scanning operation.

Following block 408, a decision block 410 determines whether any image files were identified within the retrieved HTML file. When no image files were identified by the scanning operation, then the HTTP request processing 400 is complete and ends for this particular HTTP request and no acceleration processing is performed by the proxy system.

On the other hand, when the decision block 410 determines that image files have been identified within the retrieved HTML file, the HTTP request processing 400 continues. A decision block 412 then determines whether a slot for a selected one of the image files is occupied. Here, the processing determines whether the image store contains an available file within the appropriate slot of the image store. The slots of the image store are described in greater detail below. The appropriate file can be any complete image file, whether it be the original full sized version or a reduced size version. When the decision block 412 determines that the appropriate slot contains an available file, then the processing of the selected image is complete because the processing assumes that this image was previously processed more completely and that repeating such efforts is not necessary. In this case, processing proceeds to block 426 discussed below. Of course, this assumption need not be made and the processing of the image could continue to produce a different or better reduced size version.

On the other hand, when the decision block 412 determines that the appropriate slot does not contain an available file, then the processing 400 proceeds to process the selected image to store images in the image store. A decision block 414 determines whether the appropriate slot for the selected image exists. If the appropriate slot does not exist in the image store, then the appropriate slot is created 416 in the image store. Alternatively, if the appropriate slot does exist in the image store, then block 416 is bypassed. Next, the selected image file is retrieved 418 from a content server (e.g., via the Internet). The retrieved image file is stored 420 in the appropriate slot in the image store. Here, the retrieved image file being stored in the image store is an original version of the image file. Simultaneously, the size of the retrieved image file is reduced 422. A variety of different techniques can be used to compress or otherwise reduce the file size of an image file. In one embodiment, the reduction in size of the retrieved image file would be performed by an to accelerator such as the accelerator 218 illustrated in FIG. 2.

Following blocks 420 and 422, the reduced image file is stored 424 in the appropriate slot of the image store. Previous processing ensured that the appropriate slot exists in the image store. Here, the image file being stored in the image store is a reduced image file, namely, an accelerated version of the retrieved image file. Attributes of the image file being stored could also be set to indicate that the file is in a ready state. Next, a decision block 426 determines whether there are additional images that have been identified by the scanning operation. If there are additional images to be processed, the HTTP request processing 400 returns to complete blocks 412 through 424 for each of the additional images. On the other hand, once all the images that were identified by the scanning operation have been processed, then the HTTP request processing 400 is complete and ends. However, it should be recognized that once another HTTP request is identified, the HTTP request processing 400 will begin again from the beginning.

The HTTP request processing 400 illustrated in FIG. 4 provides for improved response times to users of browsers. Namely, by storing (e.g., caching) image files in an image store of an acceleration server of a proxy system according to the invention, these images files are able to more quickly and efficiently be supplied to requestors coupled to the proxy system. The construction, arrangement and usage of the image store facilitates the rapid storage and retrieval of images to/from the image store.

Figure 5:
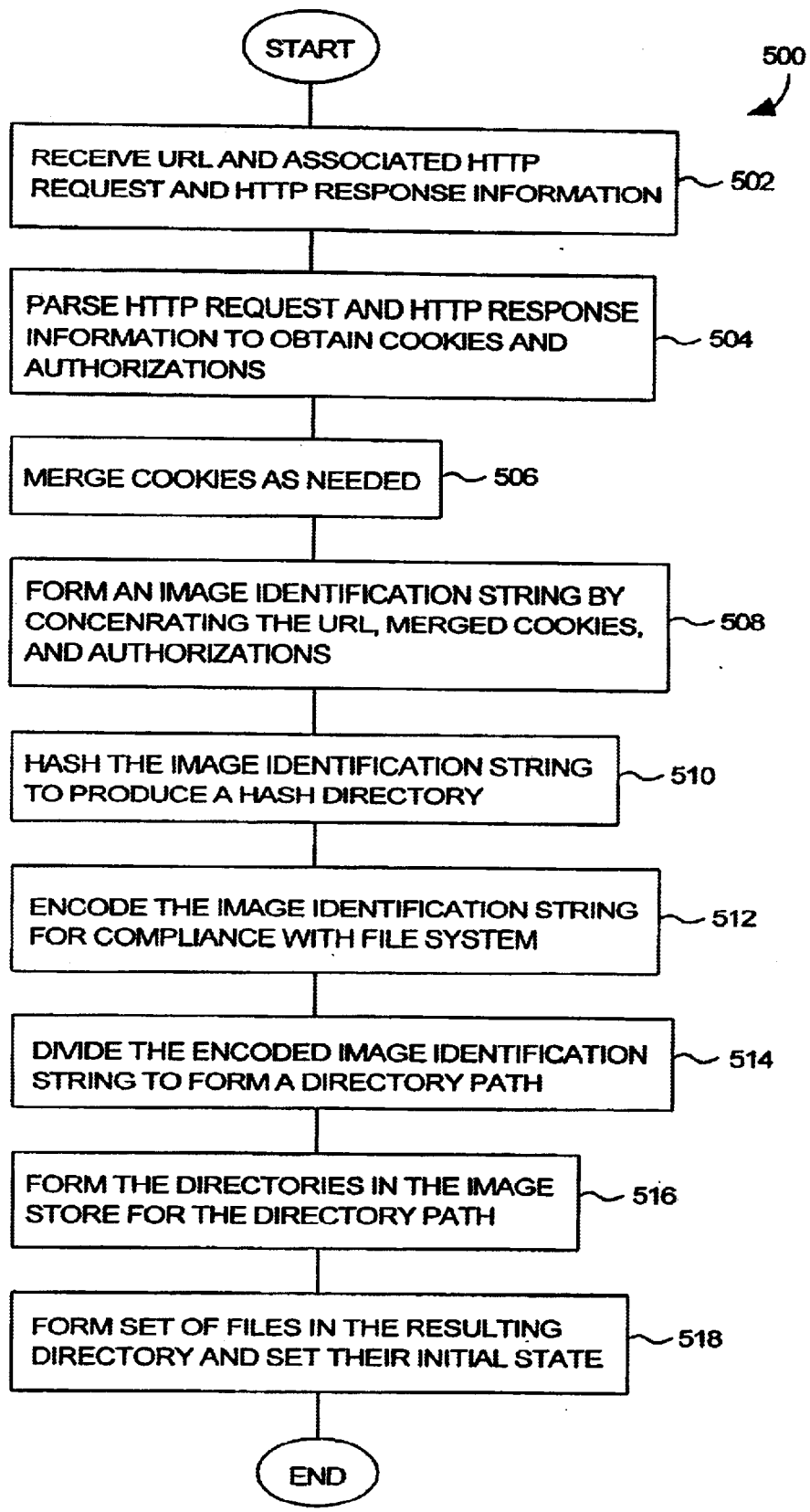
FIG. 5 illustrates a flow diagram of slot creation processing according to an embodiment of the invention.

FIG. 5 illustrates a flow diagram of slot creation processing 500 according to an embodiment of the invention. The slot creation processing 500 is, for example, performed during block 416 of the HTTP request processing 400 illustrated in FIG. 4. Also, in one embodiment, the slot creation processing 500 is performed by the image store 214 and the image store manager 216 illustrated in FIG. 2.

The slot creation processing 500 initially receives 502 a uniform resource locator (URL), associated HTTP request information, and HTTP response information. In one embodiment, the URL and the associated HTTP request and HTTP response information are provided by the proxy server 202 illustrated in FIG. 2. Typically, the HTTP request arrives at the proxy server from a browser and the HTTP response arrives at the proxy server by a content server.

Next, the HTTP request information and the HTTP response information are parsed 504 to obtain cookies and authorizations, if any, within the HTTP request and HTTP response. It is well known in the art that the HTTP protocol uses cookies and authorizations for the purpose of maintaining status information and entry permission to a particular server, namely a content server. The cookies that have been obtained are then merged 506 as needed. For example, if the HTTP request sends a particular designated cookie out for reception by a content server, the HTTP response may then in turn provide a different cookie in its reply that is to replace the particular designated cookie in the HTTP request. In such a case, the merging of the cookies would cause the updated cookie provided by the HTTP response to be used in place of the corresponding cookie contained in the HTTP request. In another case, the cookies in the HTTP request and the HTTP response are both maintained and merged. In other words, the merging 506 of cookies performs cookie management tasks in the same manner as are conventionally done in the requesting browser (e.g., the browser 104).

Next, an image identification string is formed 508. In this described embodiment, the image identification string is formed by concatenating the URL, the merged cookies and the authorizations that have been obtained by earlier processing operations of the slot creation processing 500. Hence, in one embodiment, the image identification string is a string of characters that are obtained by the concatenation of the URL, the merged cookies and the authorizations. Table 1 below indicates the structure of the image identification string formed by concatenating the URL, the merged cookies and the authorizations.

TABLE 1

| SLOT DATA STRUCTURE | | |
| --- | --- | --- |
| URL | COOKIES | AUTHORIZATIONS |

Then, the image identification string is hashed 510 to produce a hash directory. Hashing operations are well known and used to convert the large image identification string into a hash value. Here, the hash value is used as a hash directory. A suitable exemplary hash function is provided in an Appendix attached hereto. The hash directory is an upper level directory of a directory tree structure used within the image store. A representative directory tree structure is described below with respect to FIG. 8. The image identification string is also encoded 512 to provide compliance with the file system. The image store is supported by a file system that manages the access, storage and retrieval of files within the image store (e.g., disk drive). An example of one popular file system is NTFS, another example is a UNIX type file system (e.g., ext2fs which is the native file system of Linux operating system. Hence, the encoding 512 of the image identification string is performed so that the characters within the image identification string are permissible (or in compliance) with the file system. As an example, it is not uncommon for a URL to include "/", "%" or "?" but each of these characters is often unpermitted in a file system typically because these characters have specialized meanings to the file systems. Hence, the encoding 512 operates to substitute different, predetermined characters for these special characters so that the file system does not get confused by the image identification string.

Next the encoded image identification string is divided 514 to form a directory path. Here, the encoded image identification string is divided up into several pieces that form a series of directories which are referred to as a directory path. Together the directories of the directory path point to a resulting directory. In one embodiment, the file system is a NTFS file system that permits a maximum directory name size of 255 characters. Hence, in such an embodiment, the encoded image identification string can, for example, be divided into directory names of 200 characters in length. Further, between each of the directories a directory delimiter character (e.g., "in a NTFS file system and "/" in a UNIX file system) is inserted.

Thereafter, the directories are formed 516 in the image store for the directory path. In other words, the individual directories within the directory path that has been obtained by the dividing 514 the encoded image identification string are created in the image store by the file system. This facilitates the subsequent storage of the associated image files in the resulting directory by other components of the proxy system. Thereafter, a set of files in the resulting directory are formed 518 and, in addition, the initial state of these files is set. The pre-storage of such shell files (i.e., block 518) also facilitates the subsequent storage of the image data to these files as well as informing other components of the system the status (i.e., state) of these files. In an multithreaded or multi-process implementation, blocks 516 and 518 can be performed by a process while other processes are concurrently working on, for example, scanning HTTP responses, retrieving original image files, producing accelerated image files.

Here, the particular subdirectory pointed to by the directory path is referred to as a resulting directory of the directory path. The resulting directory is also known as a slot. Hence, block 516 can be referred to as creating a slot. At the resulting directory, an initial set of files is created and their states are set to initial states. These initial set of files in the resulting directory are the files for different versions of the image that is being requested. Following block 518, the slot creation processing 500 is complete and ends.

Figure 6:
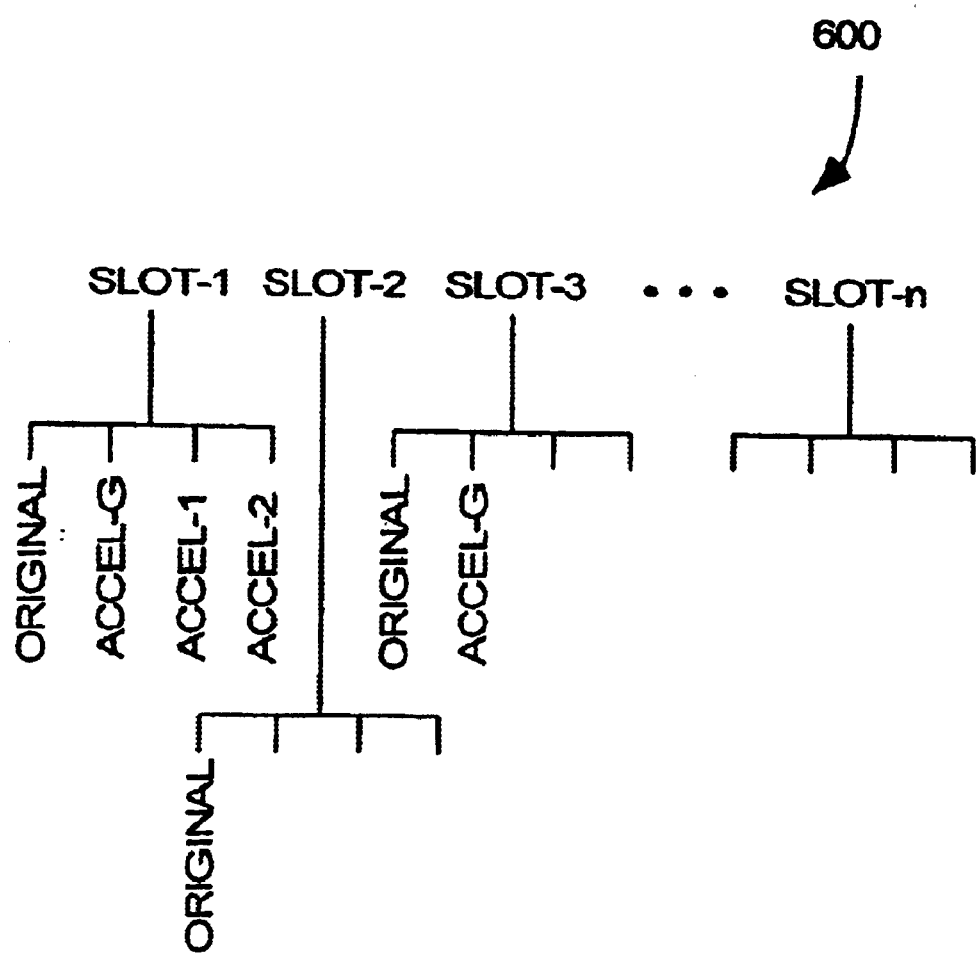
FIG. 6 is a schematic diagram of a representative slot organization within an image store according to an embodiment of the invention.

FIG. 6 is a schematic diagram of a representative slot organization 600 within an image store according to an embodiment of the invention. The slot organization 600 includes n-slots, denoted SLOT-1, SLOT-2, SLOT-3, . . . , SLOT-n. Within each of the slots, there are stored one or more objects that have a predetermined structure. In the described embodiment, the objects are images. For example, in an illustrative state, the images stored within SLOT-1 include an original image, an ACCEL-G image, an ACCEL-1 image, and an ACCEL-2 image. ACCEL-G refers to a general accelerated version, ACCEL-1 refers to a first particular accelerated version, and ACCEL-2 refers to a second particular accelerated version. In the illustrative state, SLOT-2 includes only an original object, and SLOT-3 includes an original object and an ACCEL-G object.

In general, each slot can include zero or more objects (e.g., images). A representative structure for a slot for Internet applications is provided below in Table 1, and a representative structure for the objects of a slot is provided in Table 2 below.

TABLE 1

SLOT DATA STRUCTURE

URL
COOKIE
AUTHORIZATION
HTTP DATA
OBJECT POINTERS

In Internet applications, objects (e.g., images or pages) are requested by a URL. However, additionally, there is often some additional information associated with a object request such as cookies, authorization information, and HTTP data. Cookies are used to maintain state information and/or provide identification information with the stateless HTTP protocol. Hence, as indicated by the slot data structure, a slot is determined in one embodiment from not only the URL but also any cookies and authorization information that may exist. The identified slot then contains one or more object pointers that point to the objects within the slot.

Each slot has one or more objects (e.g., images) stored therein. Each object is referred to as an entry in the slot. In one embodiment, the data structure for the entries in the slots is as shown in Table 2 which includes an object number, an object length, a MIME type (from the HTTP data), statistics data (optional), state information, and either the object data (e.g., image data) itself or a pointer thereto.

TABLE 2

SLOT ENTRY DATA STRUCTURE

URL
COOKIE
AUTHORIZATION
HTTP DATA
OBJECT POINTERS

Figure 7A:
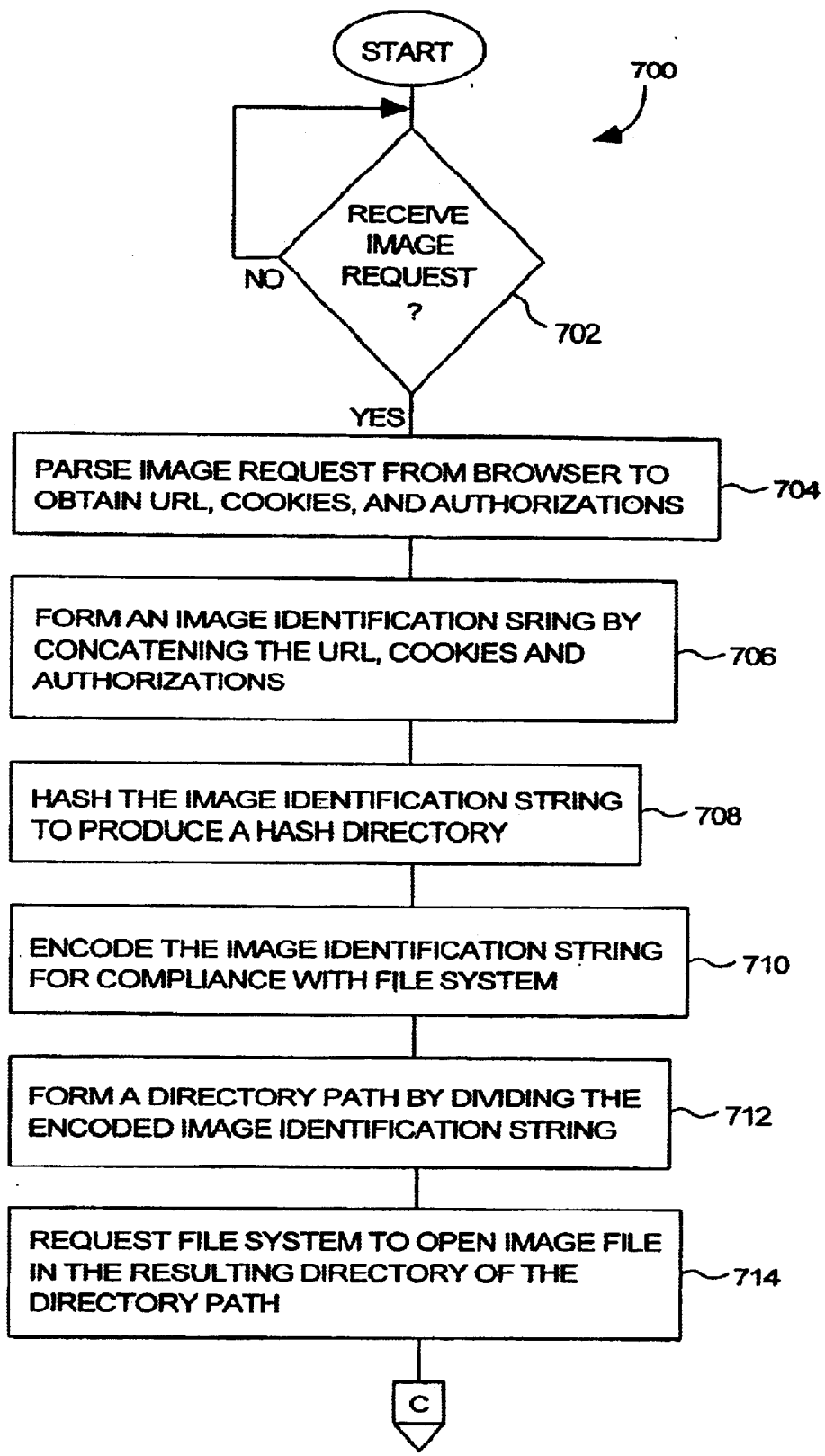
FIGS. 7A and 7B illustrate flow diagrams of image retrieval processing according to an embodiment of the invention.
Figure 7B:
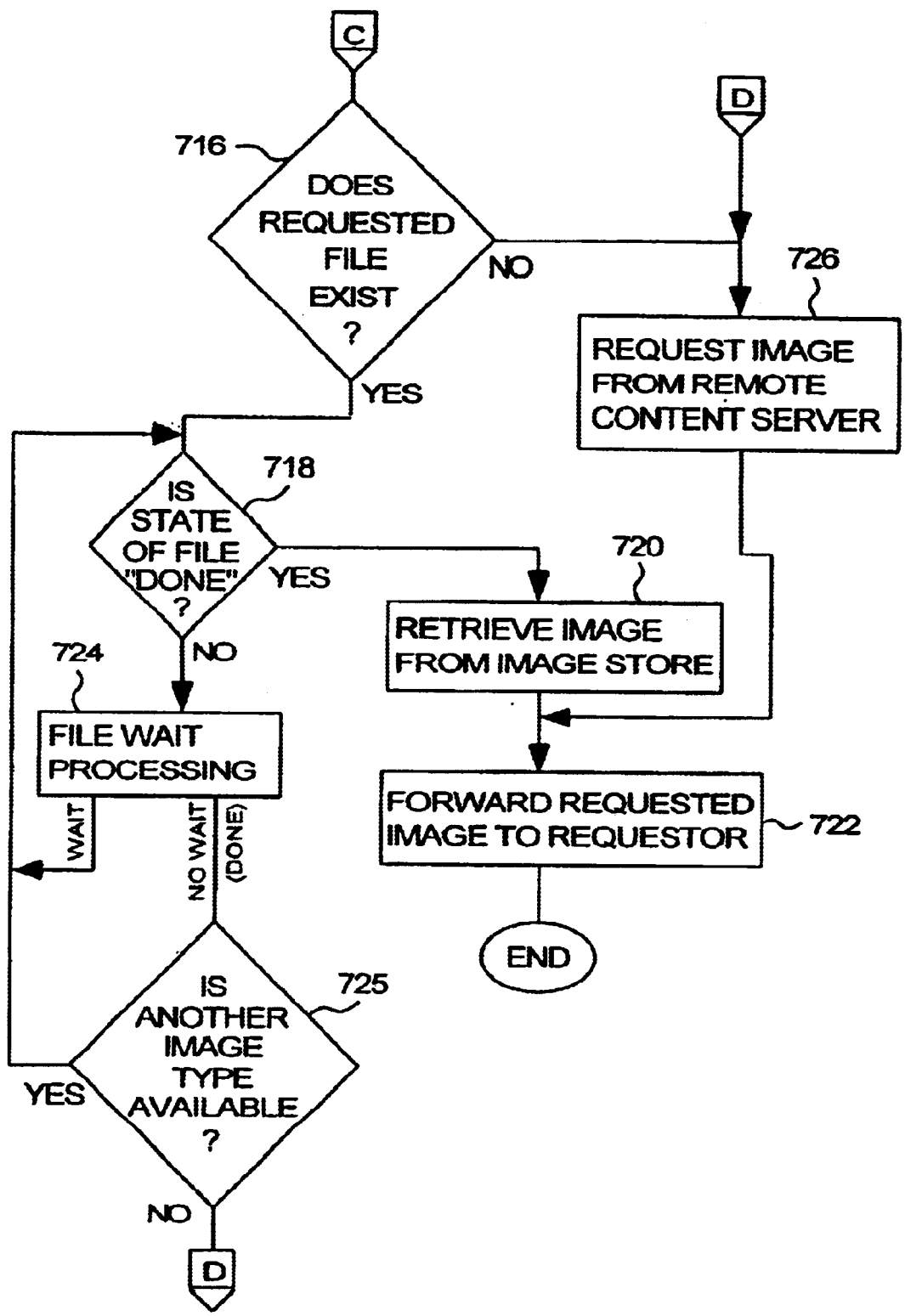

FIGS. 7A and 7B illustrate flow diagrams of image retrieval processing 700 according to an embodiment of the invention. For example, the image retrieval processing 700 operates to retrieve an appropriate image stored in the image store 214 and supply it to the proxy server 202 which in turn forwards the requested image to the appropriate one of the browsers 104 from which the request originated. Typically, following a page request (e.g., a WWW page request) and then the receipt of the requested page, the browser will individually request any images identified within the requested page that has been received. The actions taken by the proxy system in response to these individual requests for images are described by the image retrieval processing illustrated in FIGS. 7A and 7B. The image retrieval processing 700 is, for example, performed by the proxy server 202 and the image store manager 216.

In any case, the image retrieval processing 700 begins with a decision block 702. The decision block 702 causes the image retrieval processing 700 to begin once it is determined that an image request has been received. Upon receiving an image request, the image request from the browser is parsed 704 to obtain the URL, cookies and authorization. The URL specifies the requested image, and the cookies and authorizations, if any, contained in the image request (e.g., HTTP request) specify state and permission information. Next, an image identification string is formed 706 by concatenating the URL, cookies and authorizations.

Next, the image identification string is hashed 708 to produce a hash directory. As noted above with respect to FIG. 5, the hash directory identifies a particular slot (e.g., upper-level directory) within the image store where the associated image files for the requested image are stored. Next, the image identification string is encoded 710 for compliance with the file system. Next, a directory path is formed 712 by dividing the encoded image identification string. Hence, the processing of blocks 708–712 is the same as the blocks 510–514 of the slot creation processing 500. In other words, the directory path formed at the end of block 712 of the image retrieval processing 700 should yield the same directory path as that produced at the end of the block 514 of the slot creation processing 500 because the same hash function is used. Thus, for the same image, the same directory path is produced both initially during slot creation as well as subsequently in processing the retrieval of a stored image from the image store.

Following block 712, an open image file request 714 is made to the file system for a particular image file in the resulting directory provided by the directory path. Here, having located the resulting directory where the image files associated with the requested image are located, an attempt to open the appropriate one of the image files stored in the resulting directory can be made.

Next, a decision block 716 determines whether the requested file exists within the image store 214. When the decision block 716 determines that the requested image file does exist, then a decision block 718 determines whether the state of the file is "DONE". The state of the image file can be efficiently stored as an attribute of the file. The file system provides various attributes for files. If the decision block 718 determines that the state of the image file is "DONE", then the requested image is retrieved 720 from the image store. Once the image is retrieved, the requested image is then forwarded 722 to the requester. In one embodiment, the retrieved image file is supplied to the proxy server 202 which then in turn forwards the requested image file to the browser 104 associated with the requester. Following block 722, the image retrieval processing 700 is complete and ends.

On the other hand, when the decision block 718 determines that the state of the image file is not "DONE", then a file wait processing 724 is performed. The file wait processing 724 operates to wait, for example, for up to a predetermined amount of time to allow the requested file to obtain the "DONE" state. Typically, it is not uncommon for the proxy system to be currently loading the requested file into the image store, in which case the state of the file requested would be "LOADING". Hence, by waiting for the requested file to complete its loading, the proxy system is able to supply to the requester the image file requested in an efficient manner because more time would be expended in attempting to retrieve the requested image file directly from the remote content server via the network. However, the file wait processing 724 will only wait up to a certain amount of time after which, the image retrieval processing 700 will assume that the file does not exist. Also, if desirable, the file wait processing 724 can determine to wait less than the certain amount of time by the proxy system changing the state of the file requested to the "DONE" state.

Further, when the decision 716 determines that the file does not exist or when the file wait processing 724 has determined that it does not wish to wait any longer for the state of the requested file to obtain the "DONE" state, a decision block 725 determines whether another image type is available from the proxy system (e.g., a less accelerated version or the original image). If there is another image type available, then the image retrieval processing 700 returns to repeat the decision block 718 and subsequent blocks. On the other hand, when the decision block 725 determines that there are no other image types available from the proxy system, then the image retrieval processing 700 operates to request 726 the image from the remote content server. Thereafter, once the requested image has been received, it is able to be forwarded to the requester in block 722. In this situation, following block 722 the image retrieval processing 700 is complete and ends.

Figure 8:
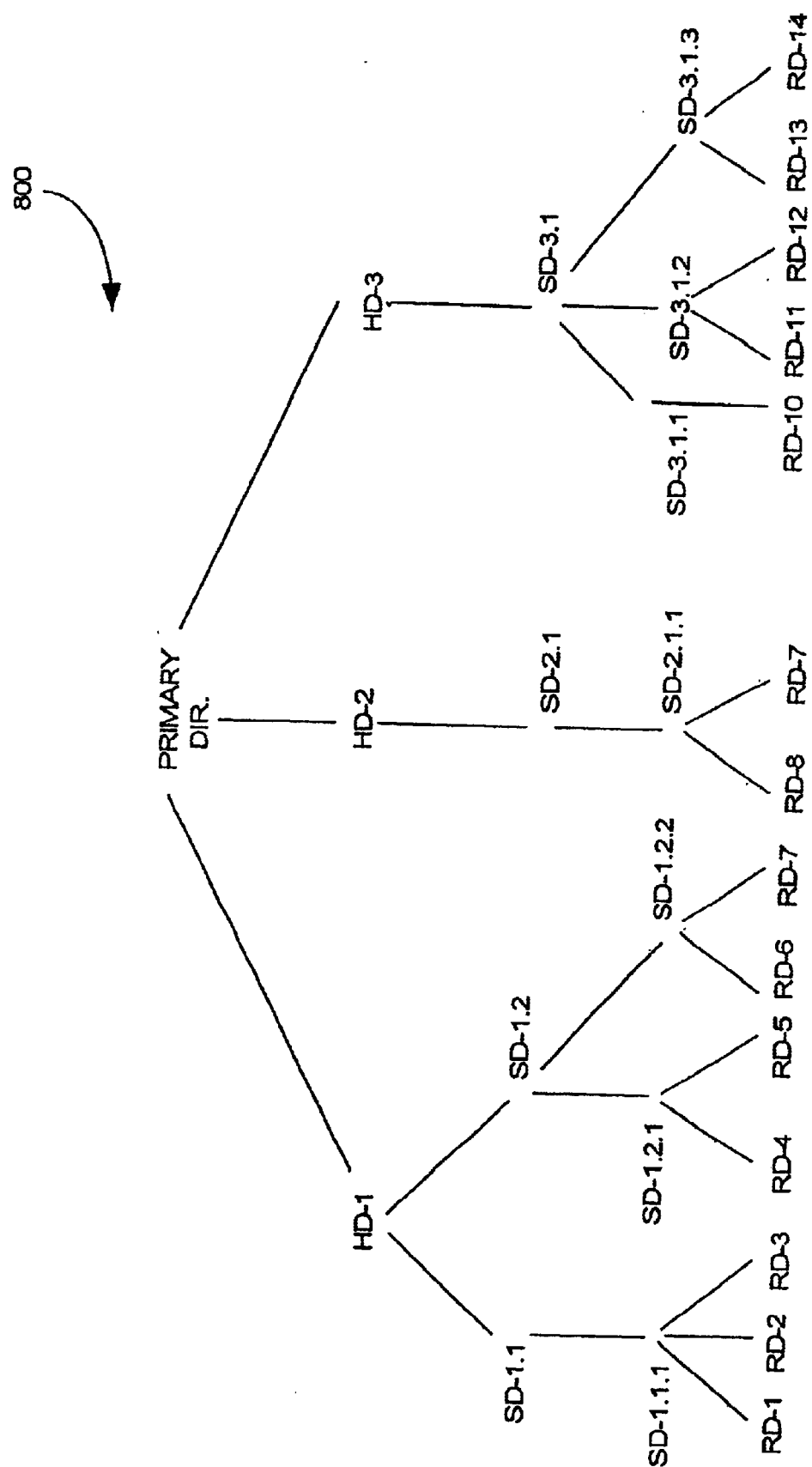
FIG. 8 is a detailed example of a directory structure for a file system in to storing image files in the image store according to an embodiment of the invention.

FIG. 8 is a detailed example of a directory structure 800 for use with the file system in storing image files in an image store. According to this example, at the top of the directory structure is a primary directory. Then at the next level down in the directory structure are a series of hash directories (e.g., HD-1, HD-2 and HD-3). These hash directories are determined from an image identification string using a hash function as noted above with respect to block 510 of FIG. 5. Below the hash directories are one or more levels of subdirectories (SD), and then below the lowest level of the subdirectories are resulting directories (RD). The resulting directories (RD) are also referred to as slots. These subdirectories (SD) and resulting directories (RD) are formed as noted above with respect to block 516 of FIG. 5. More particularly, below the hash directory HD-1 are subdirectories SD-1.1 and SD-1.2. Then, below subdirectory SD-1.1 is subdirectory SD-1.1.1, and then below subdirectory SD-1.1.1 are resulting directories RD-1, RD-2 and RD-3. Also, below subdirectory SD-1.2 are subdirectories SD-1.2.1 and SD-1.2.2. Further, below the subdirectory SD-1.2.1 are resulting directories RD-4 and RD-5, and below the subdirectory SD-1.2.2 are resulting directories RD-6 and RD-7. Below the hash directory HD-2 is subdirectory SD-2.1, and below the subdirectory SD-2.1.1 are resulting directories RD-8 and RD-9. Still further, below the hash directory HD-3 is subdirectory SD-3.1, and below the subdirectory SD-3.1 are subdirectories SD-3.1.1, SD-3.1.2 and SD-3.1.3. Below the subdirectory SD-3.1.1 is resulting directory RD-10, below the subdirectory SD-3.1.2 are resulting directories RD-11 and RD-12, and below the subdirectory SD-3.1.3 are resulting directories RD-13 and RD-14. It should be recognized that the directory structure used by the image store can take a wide variety of formats and need not follow the exemplary directory structure 800 illustrated in FIG. 8. Also, the contents of the resulting directories (RD) or slots typically store various files and can, for example, follow the representative slot organization 600 illustrated in FIG. 6.

Another aspect of the invention concerns management of available storage capacity of an image store. One of the techniques involves purging errant data from the image store, and another of the techniques involves removing stale data from the image store. Each of these techniques is described below.

The techniques for purging errant data from the image store (e.g., image store 214) according to this aspect of the invention are first explained. In one embodiment, a separate process is used to purge entries from the image store. The purging process can be referred to as an image store cleaner.

In general, the image store is operating as a cache, i.e., an intermediate storage system, which temporarily holds images that other requesters have needed in the past or images which are physically located near to other images that those systems have needed in the past. The assumption is that since that image was needed at one time, or since that image is physically located close to other images which were needed at one time, it is likely that a request for that image will likely happen again. Thus, the images stored in the image store facilitate and speed up retrieval of those images. Moreover, if the caching system decides that an image will no longer be needed in the near future or if an image is errant, then the image is marked as stale and subsequently deleted or written over with a new image.

Also, if an error occurred, that error should not adversely affect the performance nor the functionality of other pieces of the proxy system. When the image store encounters an error because of invalid data located somewhere on the Internet, the resulting errant data (e.g., errant image) is first forwarded to the requesting browser (so that the requester is aware of the error) and then immediately purged from the image store. By purging the errant data from the image store, the proxy system is able to subsequently retrieve the image from the Internet which enables a correction on the Internet to be noticed.

In one embodiment, for performance reasons, the operating system supports a multi-threaded environment and the purging of the image store is performed by a separate thread, namely, the image store cleaner. The image store cleaner can also be implemented as a separate process. The image store is able to communicate to the image store cleaner the location of the errant data within the image store.

The conventional method is to mark data as stale or invalid so that a secondary snooping process could search the cache, find stale data, and purge it. However, the process of snooping consumes resources, and there is no guarantee that errant stale data can be found in time to cause the system to attempt to reacquire the data from the content server via the Internet. This aspect of the invention improves over this conventional approach by avoiding the need for the snooping process and by being able to rapidly actually delete an entry. Thus, near-real-time cache data recovery becomes possible with this aspect of the invention.

In one embodiment for this aspect of the invention, a communications mechanism exists between two distinct objects within the proxy system to purge the errant data. The objects could be hardware objects, firmware objects or software objects. One object is responsible for reading data from and writing data to the image store (e.g., cache). When this object finds invalid, stale, or incorrect data, it sends a message to the second object detailing the location of the errant data in the image store. This second object waits for messages, and whenever it receives one, it deletes the bad cache entry as soon as possible. Hence, an improved messaging is provided between an object whose primary responsibility it is to read data from and write data to a cache (e.g., the image store) and an object whose primary responsibility is to delete incorrect, stale, or invalid entries from the cache. Thus, the cache is constantly maintained in a state where any data that is requested is valid data.

The techniques for removing stale data from the image store according to this aspect of the invention are now explained. In other words, these techniques clean out the image store so that some space is available for new images to be stored and so that its contents are not stale. Without some sort of cleaning out of the image store it would quickly fill up and then not be very useful. In a multithreaded designed proxy system, processing resources are heavily utilized such that often only little amounts of processing resources are available for such cleaning. The difficulty is then to ensure that sufficient processing resources are available even in the situation where the load is very heavy for long periods of time. Another difficulty is that the cleaning has to be done in a timely manner to prevent use of outdated data and to prevent overfilling the image store.

Conventionally, one approach of implementing image store cleanup is to have a limit set on the utilization of the image store, and if this limit is exceeded, create a thread to do the cleanup and thus lower the utilization. According to this aspect of the invention, the image store cleaning is provided by parallel threads that are each dedicated to a specific criteria and which operate to continuously scan the cache looking for outdated items based on that criterion.

In one embodiment, at start-up a main thread is started and operates to start-up several other threads. Each one of these threads continuously scans the image store and removes outdated entries based on only its particular criterion. For example, one of the threads can be responsible for cleaning based on the file date of the image files in the image store. Another thread can be responsible for cleaning entities whose HTTP expiration date shows they are already invalid. A third thread can check the utilization level and if a predetermined maximum is exceeded, a group of threads can be started to scan different parts of the image store to clean out the oldest of the entities.

Figure 9:
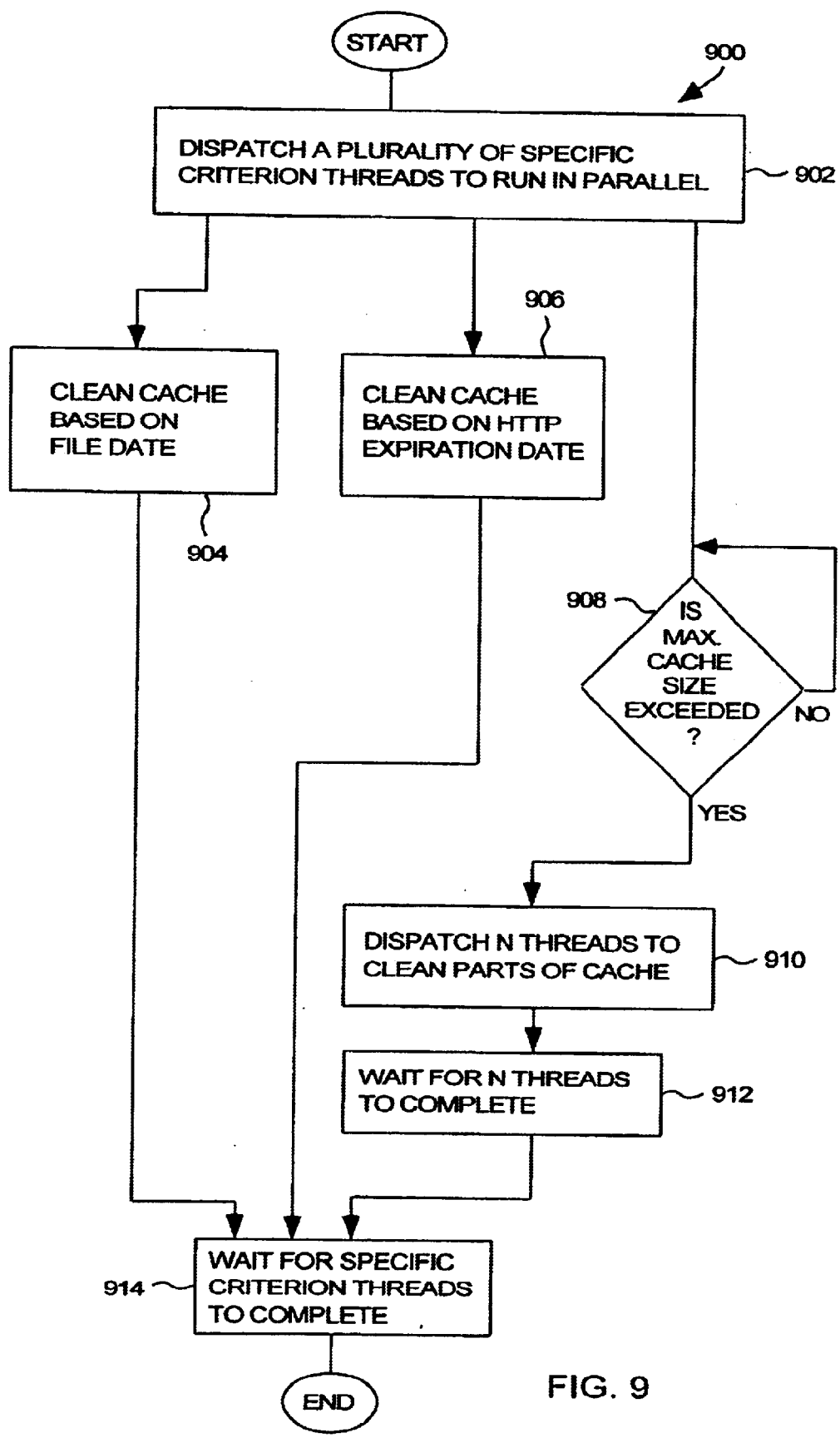
FIG. 9 is a block diagram of image store cleaner processing according to an embodiment of the invention.

FIG. 9 is a block diagram of image store cleaner processing 900 according to an embodiment of the invention. The image store cleaner processing 900 implements a multithreaded cleaner with a main thread and three criterion threads. The image store cleaner processing 900 cleans out expired, aged or older entries in the image store (more generally, the cache).

The image store cleaner processing 900 initially dispatches 902 a plurality of specific criterion threads to run in parallel. The main thread is used to dispatch 902 the specific criterion threads. The three criterion threads operate to each independently clean the image store using different criteria. A first criterion thread cleans 904 the image store based on file dates for files stored in the cache. A second criterion thread cleans 906 the image store based on HTTP expiration dates for files stored in the cache. A third criterion thread operates in a more complicated manner to clean the image store in a rapid manner when utilization is dangerously high. The third criterion thread begins with a decision block 908 that determines whether a maximum cache size is exceeded. If the maximum cache size has not been exceeded, then the third criterion thread is not invoked. On the other hand, if the maximum cache size has been exceeded, then the third criterion thread is invoked by dispatching 910 N threads. The N threads are used to independently clean N different parts of the cache. These parallel N threads are used to rapidly clean out the cache to make space available when the decision block 908 determines that the cache utilization has become dangerously high. Then, in block 912, the image store cleaner processing 900 waits 912 for the N threads to complete.

Thereafter, the image store cleaner processing 900 waits 914 for the specific criterion threads to complete. Once each of the three criterion threads have completed, the image store cleaner processing 900 is complete and ends. There are various advantages of using parallel threads in this manner for cleaning out the image store. One advantage is that by having one thread per cleanup criterion faster detection of outdated information is possible. Also, each of the threads operating on a specific criterion run in parallel and each one performs a simple check on each entry, rather than a complex set of checks. Another advantage is that when the image store becomes dangerously full, the cleanup becomes heavily multithreaded to free some space very rapidly so that the image store does not overflow. Another advantage is that the design is modular and easily expandable. For example, if a new criterion is to be checked by a newly added thread, the existing computer code can be easily supplemented to add the new thread without any significant modifies to the existing code. The multithreaded-ness of the image store cleaner is thus fully partitioned. Each of the threads can have a specific job that does not overlap with that of other threads. As a result, there is no contention among the threads and thus scalability of the multi-threaded application is not inhibited.

When the image store follows a database design, it is not uncommon for queries to the database to be made for certain image files. The general problem involved here is that of database querying in real time is typically not able to generate results based on the most current data set. For example, as the query is taking place, other data can be in the process of being stored in the database, and thus the time in which the query returns its results to the requester the database may already have changed. This type of problem is particularly problematic when an application or user knows in advance that a particular record, or sets of records, have been submitted to the database, but which are not currently present at the time in which a query is run. The conventional solution is simply to rerun the query until the desired data is found within the database. The typical solution, however, is very wasteful of processing resources and can affect the performance of a complete system.

Another aspect of the invention provides the technique in which the need to rerun a query for a database until the desired data is found is eliminated. Here, when a query is made that has an expectation about the data set which should be formed as part of the result, the user or application can also provide a time-out together with the query, if the query results come up negative, the query itself is filed in a signaling subsystem in a wait state. Then, when the desired data is eventually filed in the database, the signaling subsystem can be notified such that the query is wakened up and rerun to obtain the appropriate results to the requesting application or user. Also, if the wake-up does not occur within the time-out period, the query can return a failed result or a result set that does not include the expected data. This technique also solves the latency problem in cases where the querying portion of a system runs faster than the filing portion of a system, by allowing the application queries to wait for a result set to eventually appear.

The advantages of the invention are numerous. One advantage of the to invention is that images are able to be more efficiently and rapidly stored and retrieved from an image store. Another advantage is that the image store can utilize a file system to provide an efficient database structure. Still another advantage of the invention is that state and authorization information are stored with the image identifiers (i.e., URL) in the database structure without the overhead of a conventional database. Yet another advantage of the invention is that states for the files can be stored as attributes of the files as provided by the file system. Still another advantage of the invention is that high performance operation of an image store can be maintained by utilizing parallel processes or threads for cleaning the image store.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

APPENDIX

```
A suitable exemplary hash function is descibed in this Appendix.
The directory hashing algorithm is a two-stage process: 1) Determine into which hash bucket, that is
into which directory of =D0 . . . Dn,=20 the image and meta data should be placed. 2) Map the URL-
Cookie-Authorization triplet into a directory sequence,=20 subordinate to the Dx chosen, which is
unique for the triplet and =reproduceable=20 so that subsequent lookup operations can find it.
First, the hash-bucket algorithm:
void HashDirectory (
     String IN URL,
     String OUT HashBucket,
     Number IN NumberofBucketsAvailable )
begin
     Number CurrentHash;
     Number HashConverter;
     Number URLPosition;
=09
     HashBucket =3D "D";          //"D" starts off any bucket name.
     if(URL.left(0.7) =3D=3D "http://" )     //If the URL's
protocol = is HTTP.
     then URL =D URL.right(B, URL.length( ) );//Dump the
protocol = portion of the URL.
        endif
     CurrentHash =3D 0;           //Initialize the hash bucket.
     URLPosition =3D 0;           //Initialize the character indicator.
repeat while(URLPosition < URL.length( ) ) //Loop until the end of
= the URL is reached.
beginrepeat
     HashConverter =3D (Number) URL.charAt(URLPosition);
//Convert the = character to a Number
//and dump current contents of =20 //HashConverter.
     URLPosition =3D URLPosition + 1;
//Inccrement the = character indicator.
//This pseudo-code assumes that a character is stored in half as =
many bits as required to=20 store a Number, for convenience sake, the
pseudo-code assumes 16 = bits for a character and 32 bits for a
number.
     Hashconverter.shiftLeft(16);
//Shift the character bits to the = high-order portion of=20 the
HashConverter. This leaves the low-order = portion zeroed out.
//The next line replaces the low-order portion of HashCnverter =
with the bits that represent=20 the next character in the URL String.
     HashConverter =3D HashConverter + (Number) URL.charAt(
URLPosition = );
     URLPosition =3D URLPosition + 1;
//Increment the = character indicator.
     CurrentHash =3D CurrentHash + HashLConverter;
//Add to = CurrentHash.
endrepeat
//The currentHash variable is forced to be positive. This = differs from an absolute value=20 in that
we are not concerned with what the number actually is. = Rather we simply wish to mask the
number with a bit pattern which turns off the negative bit for = the given platform.
     CurrentHash =3D CurrentHash.forcePositive( );
//We now take current hash modulo NumberOfBucketsAvailable to select
= a particular hash bucket. The % operator is the modulo operator.
```

APPENDIX-continued

```
    CurrentHash =3D CurrentHash % NumberOf BucketsAvailable;
//Concatenate the bucket number to HashBucket to complete.
    HashBucket.concatenate( CurrentHash.convertToString( ) );
end
The next algorithm takes three different strings (a URL, a Cookie =
and an Authorization) and =20 convert them into a directory sequence
which is then concatenated to = the Hash Bucket. This full=20
directory sequence then becomes the unique location of the =
URL-Cookie-Authoriztion triplet in the=20 Image Store.
void TripletHash(String IN URL,
                String IN Cookie,
                String IN Authoriztion,
                String IN HashBucket,
                String IN ObjectName,
                String OUT HashDirectory)
begin
    DirectoryString HashDirectory;
//First all characters in the URL, cookie, and =
authorization are mapped to valid characters for out target file
system. This may include = the replacement of any directory path
delimiters (such as '/' on many platforms) = with a different
character, since the intention is to handle directory delimiters =
later. Since this is platform-dependent, no details of that conversion are = offered here.
    URL =3D URL.mapAllCharactersToValidFileSystemCharacters( );
    Cookie =3D
    Cookie. mapAllCharactersToValidPileSystemCharacters( );
    Authorization =3D =
    Authorization.mapAllCharactersToValidFilesystemCharacters( );
Next, set up the HashDirectory by concatenating the =
URL-Cookie-Authorization triplet onto the=20 Hashsucket base.
    HashDirectory.set(HashBucket);
    HashDirectory.concatenate(URL);
    HashDirectory.concatenate(Cookie);.
    HashDirectory.concatenate(Authorization);
//Next, add appropriate directory path delimiters into the =
HashDirectory string. Again, this delimiter is platform-specific,
although = typically it is a character such as 1.1, 1\1, 1P, or ':
MAX_DIRECTORY LENGTH is = an operating system constant which denotes
the maximum length of any particular = directory in a given path. It
is assumed here that the maximum total length of the path is a =
large number, as is=20 the case for several file systems, including
NTFS, OS/400, OS/2, = ext2fs, VMS file system, and others.
    HashDirectory.addPathDelimiter(MAX DIRECTORY LENGTH);
//The createDirectories function generates all directories indicated
= in the HashDirectory string. createDirectories simply does nothing if the sequence = already
exists, as is the case for an entry already written to the Image Store.
    HashDirectory.createDirecories( );
//ObjectName is the name of an appropriate file system object that = represents the item being
added to searched for in the Image Store. This could be = the original image, one of=20 several
accelerated images, or metadata.
HashDirectory.addObjectName(ObjectName);
//This function does not handle the problem of actually creating th_
= object, only the directories which point to it. The caller is
either a cache-entry function or = a cache-lookup function. =20 The caller decides whether to search
for the object or create it = outright.
end
```

What is claimed is:

1. A proxy system for accelerated delivery of objects to a requester, the proxy system comprising:
   an object storage device for storing objects, the object storage device using a file system that supports directories to store the objects in files at directory locations within the object storage device, for each of the objects the directory location where the object is to be stored is identified by an object locator associated with the network together with state and authorization information, wherein the combination of the object locater together with state and authorization information identify a unique slot in said object storage device; and
   a proxy server coupled between the requestors computer and a network of computers, wherein the proxy server intercepts a request for an object from the requestor's computer to the network of computers, and then satisfies the request by delivering the object requested from the object storage device to the requestor's computer, the object requested from the object storage device is retrieved from the object storage device using a combination of an object locator obtained from the request together with state and authorization information associated with the request.

2. A proxy system as recited in claim 1, said proxy system comprising:
   an acceleration unit coupled to said proxy server, said acceleration unit operates to produce an accelerated version of certain of the objects stored in said object storage device, and
   wherein said proxy server satisfies the request by delivering, when available, the accelerated version of the object requested from said object storage device to the requestor'S computer.

3. A proxy system as recited in claim 2 wherein directory structure within said object storage device implements a database.

4. A system as recited in claim 1 wherein said object storage device stores a plurality of files within each of the slots in said storage device.

5. A system as recited in claim 4 wherein within each of the files stored in a given one of the slots in said object device pertain to a different version of the object associated with the given one of the slots.

6. A system as recited in claim 4 wherein the different version include an original version of the object and at least one accelerated version of the object.

7. A system as recited in claim 4 wherein said object storage device also stores a state for each of the files.

8. A system as recited in claim 4 wherein the directories used by said object storage device are provided by a file system, and wherein the file system further provides attributes for the files, and wherein the state stored for each of the files is stored as an attribute.

9. A system as recited in claim 4 wherein the states for the files include a ready state and a loading state.

10. A proxy system for accelerated delivery of objects to a requestor, the proxy system comprising:

an object storage device for storing objects, the object storage device using a file system that supports directories to store the objects in files at directory locations within the object storage device, for each of the objects the directory location where the object is to be stored is identified by at least an object locator, wherein the object storage device also stores a current state for each of the files; and a proxy server coupled between the requestor's computer and a network of computers, wherein the proxy server intercepts a request for an object from the requestor's computer to the network of computers, and then satisfies the request by delivering the object requested from the object storage device to the requestor's computer, the object requested from the object storage device is retrieved from the object storage device using an object locator obtained from the request.

11. A system as recited in claim 10 wherein the directories used by said object storage device are provided by a file system, and wherein the file system further provides attributes for the files, and wherein the current state stored for each of the files is stored as an attribute.

12. A system as recited in claim 11 wherein the state for the files included a ready state and a loading state.

13. A proxy system as recited in claim 10 wherein directory structure within said object storage device implements a database.

14. A proxy system as recited in claim 10, said proxy system comprising:

an acceleration unit coupled to said proxy server, said acceleration unit operates to produce an accelerated version of certain of the objects stored in said object storage device, and wherein said proxy server satisfies the request by delivering, when available, the accelerated version of the object requested from said object storage device to the requestor's computer.

15. A proxy system for accelerated delivery of objects to a requestor, to proxy system comprising:

an object storage device for storing objects, the object storage device using a file system that supports directories to store the objects in files at directory locations within the object storage device, for each of the objects the directory location where the object is to be stored is identified by at least an object locator, wherein the object locator together wit state and authorization information identify a unique slot in said object storage device; and a proxy server coupled between the requestor's computer and a network of computers, wherein the proxy server intercepts a request for an object from the requestor's computer to the network of computers, and then satisfies the request by delivering the object requested from the object storage device to the requestor's computer, the object requested from the object storage device is retrieved from the object storage device using an object locator obtained from the request.

16. A system as recited in claim 15 wherein said object storage device stores a plurality of files within each of the slots in said object storage device.

17. A system as set forth in claim 16 wherein within each of the files stored in a given one of the slots in said object storage device pertain to a different version of the object associated with the given one of the slots.

18. A system as recited in claim 17 wherein the different versions include an original version of the object and at least one accelerated version of the object.

19. A system as recited in claim 17 wherein said abject storage device also stores a state for each of the files.

20. A system as recited in claim 19 wherein the directories used by said object storage device are provided by a file system, and wherein the file system further provides attributes for the flies, and wherein the state stored for each of the files is stored as an attribute.

* * * * *